United States Patent
Funato

(10) Patent No.: US 11,308,344 B2
(45) Date of Patent: Apr. 19, 2022

(54) IMAGE PROCESSING APPARATUS, IMAGE FORMING APPARATUS, DISPLAY APPARATUS, IMAGE PROCESSING METHOD, AND STORAGE MEDIUM

(71) Applicant: KONICA MINOLTA, INC., Tokyo (JP)

(72) Inventor: Misaki Funato, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/892,495

(22) Filed: Jun. 4, 2020

(65) Prior Publication Data
US 2020/0387730 A1    Dec. 10, 2020

(30) Foreign Application Priority Data
Jun. 10, 2019    (JP) .............................. JP2019-108002

(51) Int. Cl.
| | |
|---|---|
| *G06T 5/00* | (2006.01) |
| *G06K 9/34* | (2006.01) |
| *G06T 5/20* | (2006.01) |
| *G06T 5/50* | (2006.01) |

(52) U.S. Cl.
CPC .............. *G06K 9/344* (2013.01); *G06T 5/20* (2013.01); *G06T 5/50* (2013.01); *G06K 2209/01* (2013.01)

(58) Field of Classification Search
CPC ...... G06K 9/344; G06K 2209/01; G06T 5/20; G06T 5/50; G06T 2207/20212
See application file for complete search history.

(56) References Cited

U.S. PATENT DOCUMENTS

| | | | | |
|---|---|---|---|---|
| 9,418,399 | B1* | 8/2016 | Perciballi | ............ G06T 11/001 |
| 2005/0140676 | A1* | 6/2005 | Cho | ........................ G06T 17/05 |
| | | | | 345/440 |
| 2015/0078676 | A1* | 3/2015 | Arai | ......................... G06T 5/10 |
| | | | | 382/260 |
| 2020/0387730 | A1* | 12/2020 | Funato | ...................... G06T 5/20 |

FOREIGN PATENT DOCUMENTS

JP    5385487 B1    1/2014

OTHER PUBLICATIONS

Oliva et al., "Hybrid Images", ACM Transactions on Graphics, ACM, NY, US, Jul. 1, 2006, vol. 25, No. 3, pp. 527-532, XP058328146.
Extended European Search Report dated Nov. 9, 2020, issued by the European Patent Office in corresponding European Application No. 20179369.2. (10 pages).

* cited by examiner

*Primary Examiner* — Sean T Motsinger
(74) *Attorney, Agent, or Firm* — Buchanan Ingersoll & Rooney PC

(57) ABSTRACT

An image processing apparatus is provided, which includes: an input unit that receives input of a first image and a second image; a high-frequency image extractor that extracts a high-frequency image from the first image; a low-frequency image extractor that extracts a low-frequency image from the second image; an edge portion extractor that extracts an edge image of the second image; a determination unit that determines a composite position of the high-frequency image and the low-frequency image so that a degree of overlap between the first image and an edge portion is small, and a combiner that combines the high-frequency image and the low-frequency image at the composite position determined by the determination unit.

20 Claims, 23 Drawing Sheets

B (EDGE IS OVERLAPING)

A (EDGE IS NOT OVERLAPING)

FIG.14

DIAGRAM SHOWING PIXEL VALUE AND
IDENTIFICATION NUMBER OF EACH
CELL OF LABEL MATRIX

| 1<br>(1) | 1<br>(2) | 1<br>(3) | 1<br>(4) | 1<br>(5) | ← CELL |
|---|---|---|---|---|---|
| 2<br>(6) | 2<br>(7) | 2<br>(8) | 2<br>(9) | 2<br>(10) | |
| 2<br>(11) | 3<br>(12) | 3<br>(13) | 3<br>(14) | 2<br>(15) | |
| 2<br>(16) | 3<br>(17) | 4<br>(18) | 3<br>(19) | 2<br>(20) | |
| 2<br>(21) | 3<br>(22) | 3<br>(23) | 3<br>(24) | 2<br>(25) | |
| 2<br>(26) | 2<br>(27) | 2<br>(28) | 2<br>(29) | 2<br>(30) | |
| 1<br>(31) | 1<br>(32) | 1<br>(33) | 1<br>(34) | 1<br>(35) | |

CENTER CELL points to cell (18).

FIG.15A
CLOSE-UP IMAGE HAVING LABEL MATRIX APPLIED WITH REFERENCE TO (1, 1)

FIG.15B
CLOSE-UP IMAGE HAVING LABEL MATRIX APPLIED WITH REFERENCE TO (9, 4)

FIG.15C
CLOSE-UP IMAGE HAVING LABEL MATRIX APPLIED WITH REFERENCE TO (3, 10)

511F

FIG.15D
CLOSE-UP IMAGE HAVING LABEL MATRIX APPLIED WITH REFERENCE TO (3, 11) (PRIOR TO CALCULATION)

FIG.15E
CLOSE-UP IMAGE HAVING LABEL MATRIX APPLIED WITH REFERENCE TO (3, 11) (AFTER CALCULATION)

FIG.17A
ONE EXAMPLE OF APPLICATION OF REFERENCE PIXEL OF EDGE IMAGE TO COORDINATES (1, 1) OF PIXEL VALUE INFORMATION

REFERENCE PIXEL OF EDGE IMAGE

FIG.17B
ONE EXAMPLE OF APPLICATION OF REFERENCE PIXEL OF EDGE IMAGE TO COORDINATES (1, 5) OF PIXEL VALUE INFORMATION

REFERENCE PIXEL OF EDGE IMAGE

FIG.17C
ONE EXAMPLE OF APPLICATION OF REFERENCE PIXEL OF EDGE IMAGE TO COORDINATES (2, 1) OF PIXEL VALUE INFORMATION

REFERENCE PIXEL OF EDGE IMAGE

FIG.25 EMBODIMENT 3

IMAGE PROCESSING APPARATUS, IMAGE FORMING APPARATUS, DISPLAY APPARATUS, IMAGE PROCESSING METHOD, AND STORAGE MEDIUM

The entire disclosure of Japanese Patent Application No. 2019-108002, filed on Jun. 10, 2019 is incorporated herein by reference in its entirety.

BACKGROUND

Technological Field

The present disclosure relates to an image processing apparatus, an image forming apparatus, a display apparatus, an image processing method, and a storage medium.

Description of the Related Art

Conventionally, a display apparatus is proposed which combines a close-up image and a far-away image to generate a composite image for display (e.g., U.S. Pat. No. 5,385,487). The close-up image is intended to be perceived by a viewer who is close to the display apparatus. The far-away image is intended to be perceived by a viewer who is far away from the display apparatus.

SUMMARY

However, the display apparatus disclosed in U.S. Pat. No. 5,385,487 fails to consider the composite position of a close-up image and a far-away image. Accordingly, depending on the composite position of the close-up image and the far-away image, for example, a majority of edge portions of the far-away image overlaps with the close-up image, resulting in a composite image that is not easy for the viewer to perceive.

The present disclosure is made in view of such circumstances. An object of the present disclosure is to propose a technology of generating a composite image that is easy for a viewer to perceive.

To achieve the abovementioned object, according to an aspect of the present disclosure, an image processing apparatus reflecting a certain aspect of the present disclosure comprises a controller that: receives input of a first image and a second image; extracts a high-frequency image from the first image; extracts a low-frequency image from the second image; extracts a density change portion of one of the second image and the low-frequency image; determines a composite position of the high-frequency image and the low-frequency image so that a degree of overlap between the density change portion and one of the first image and the high-frequency image is small; and combines the high-frequency image and the low-frequency image at the determined composite position.

To achieve the abovementioned object, according to an aspect of the present disclosure, an image forming apparatus according to another aspect of the present disclosure comprises: a controller; and an image forming unit, wherein the controller: receives input of a first image and a second image; extracts a high-frequency image from the first image; extracts a low-frequency image from the second image; extracts a density change portion of one of the second image and the low-frequency image; determines a composite position of the high-frequency image and the low-frequency image so that a degree of overlap between the density change portion and one of the first image and the high-frequency image is small; and combines the high-frequency image and the low-frequency image at the determined composite position, and the image forming unit forms the combined image onto a recording medium.

To achieve the abovementioned object, according to an aspect of the present disclosure, a display apparatus according to still another aspect of the present disclosure comprises: a controller; and a display, wherein the controller: receives input of a first image and a second image; extracts a high-frequency image from the first image; extracts a low-frequency image from the second image; extracts a density change portion of one of the second image and the low-frequency image; determines a composite position of the high-frequency image and the low-frequency image so that a degree of overlap between the density change portion and one of the first image and the high-frequency image is small; and combines the high-frequency image and the low-frequency image at the determined composite position, and the display displays the combined image.

To achieve the abovementioned object, according to an aspect of the present disclosure, an image processing method according to still another aspect of the present disclosure comprises: extracting a high-frequency image from an input first image; extracting a low-frequency image from an input second image; extracting a density change portion of one of the second image and the low-frequency image; determining a composite position of the high-frequency image and the low-frequency image so that a degree of overlap between the density change portion and one of the first image and the high-frequency image is small; and combining the high-frequency image and the low-frequency image at the composite position.

To achieve the abovementioned object, according to an aspect of the present disclosure, a computer-readable storage medium according to still another aspect of the present disclosure stores a program for causing a computer to: extract a high-frequency image from an input first image; extract a low-frequency image from an input second image; extract a density change portion of one of the second image and the low-frequency image; determine a composite position of the high-frequency image and the low-frequency image so that a degree of overlap between the density change portion and one of the first image and the high-frequency image is small; and combine the high-frequency image and the low-frequency image at the composite position.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

The advantages and features provided by one or more embodiments of the disclosure will become more fully understood from the detailed description given herein below and the appended drawings which are given by way of illustration only, and thus are not intended as a definition of the limits of the present disclosure.

FIG. 14 is a diagram showing a label matrix according to the present embodiment.

FIGS. 15A to 15E are diagrams each showing a close-up image having the label matrix applied thereto.

FIGS. 17A to 17C are diagrams each showing pixel value information having an edge image applied thereto.

DETAILED DESCRIPTION OF EMBODIMENTS

Figure 1:
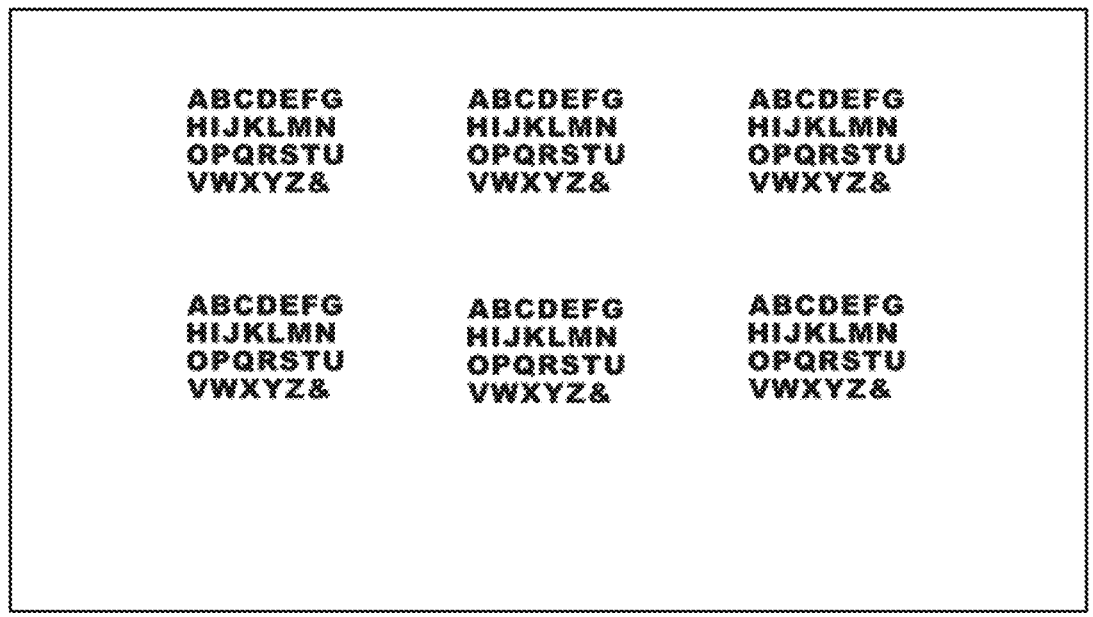
FIG. 1 is a diagram showing one example close-up image.

Hereinafter, one or more embodiments of the present disclosure will be described with reference to the drawings. However, the scope of the disclosure is not limited to the disclosed embodiments.

An image forming apparatus according to embodiments of the present disclosure will be described, with reference to the accompanying drawings. In the embodiments described below, when referring to the number, amount, etc., the scope of the present disclosure is not necessarily limited to the number, amount, etc., unless otherwise specified. The same reference numerals refer to like parts and corresponding parts, and redundant description may not be repeated. It is planned from the beginning to use the configurations according to the embodiments in combination as appropriate.

Embodiment 1

[Outline]

Today in the information society, advertisement is an essential tool for companies to reach many consumers. Sometimes, companies display text advertisements. An advantage of text advertisement is that text advertisements are inexpensive for companies that wish to place an advertisement, as compared to placing banner advertisements (an advertisement represented by an image, a display advertisement). Meanwhile, signage, which displays a directory and an advertisement in a station or a hospital, is increasing in recent years.

Signage displays text in a text size intended to be seen by a person (also referred to as a viewer) from any position. However, the distance between the person and the signage is unknown. For example, it is hard for a person who is away from a signage to see an image (letter) on the signage that is intended to be taken a close look at. In contrast, it is hard for a person who is close to a signage to view an image (letter) on the signage that is intended to be viewed from a distance.

Thus, an image processing apparatus is proposed which employs a superhybrid approach which combines an image that is intended to be taken a close look at (hereinafter, also referred to as a "close-up image") and an image that is intended to be viewed from a distance (hereinafter, also referred to as a "far-away image"). The superhybrid approach is disclosed in U.S. Pat. No. 5,385,487, for example. Moreover, in general, a viewer easily perceive an image that has a spatial frequency at which the contrast sensitivity is maximum. If a filter is applied to the image to achieve that spatial frequency, a human can easily perceive the image.

Figure 2:
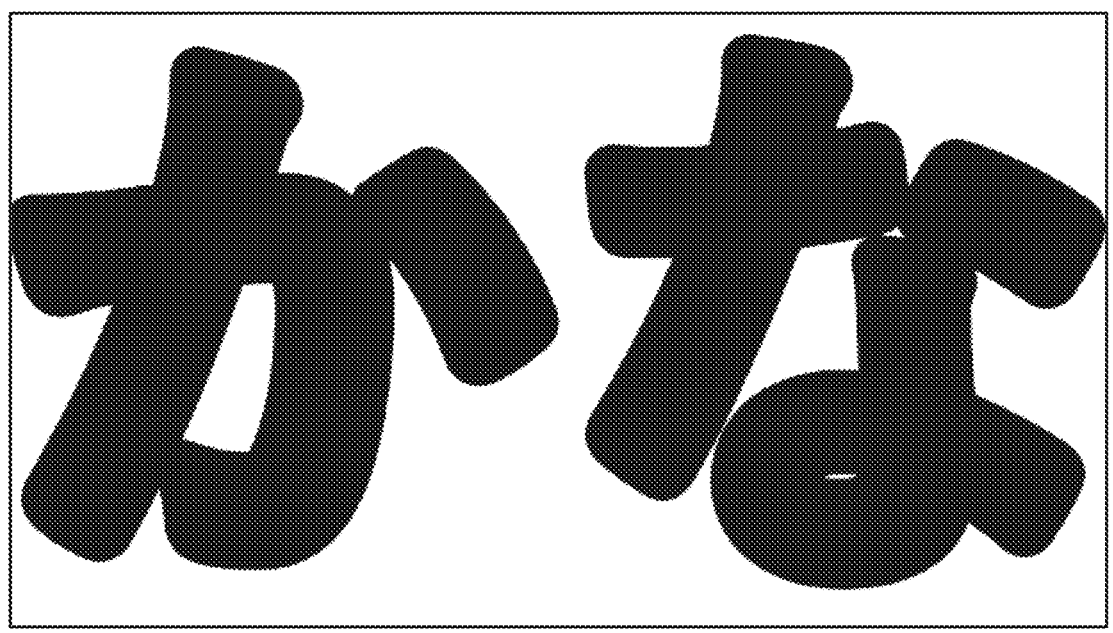
FIG. 2 is a diagram showing one example far-away image.

FIG. 1 shows one example close-up image. FIG. 2 shows one example far-away image. The close-up image is an image of alphabets "A to Z," etc. arranged. The far-away image is an image of characters "あぁ" Each character included in the far-away image is larger in size than any character included in the close-up image.

Figure 3:
FIG. 3 is a diagram showing one example high-frequency image.
Figure 4:
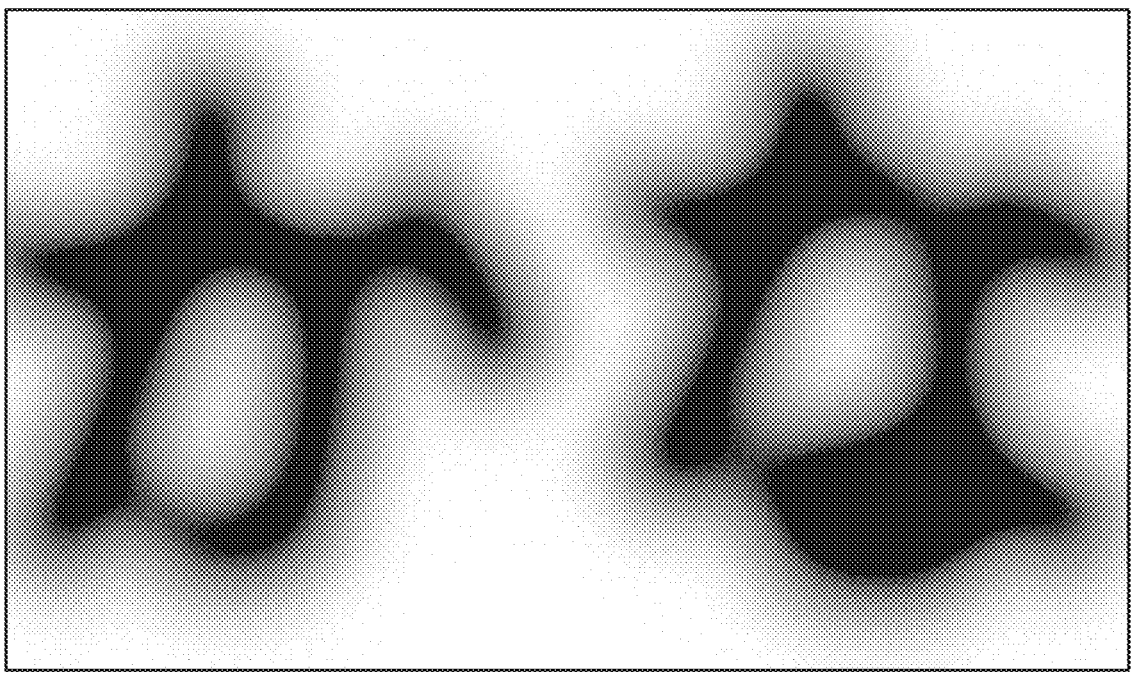
FIG. 4 is a diagram showing one example low-frequency image.

When the image processing apparatus combines a far-away image and a close-up image, the image processing apparatus extracts an image having a high-frequency component in the spatial frequency from the close-up image, and extracts an image having a low-frequency component in the spatial frequency from the far-away image. Hereinafter, "the image having the high-frequency component in the spatial frequency" will be referred to as a "high-frequency image," and "the image having the low-frequency component in the spatial frequency" will be referred to as a "low-frequency image." FIG. 3 is one example high-frequency image. FIG. 4 is one example low-frequency image. The high-frequency image shown in FIG. 3 includes characters, such as "A," "B," "C," etc. having a defined edge. In contrast, the low-frequency image shown in FIG. 4 includes characters, "あ" and "ぁ" having a blurred edge.

Figure 5:
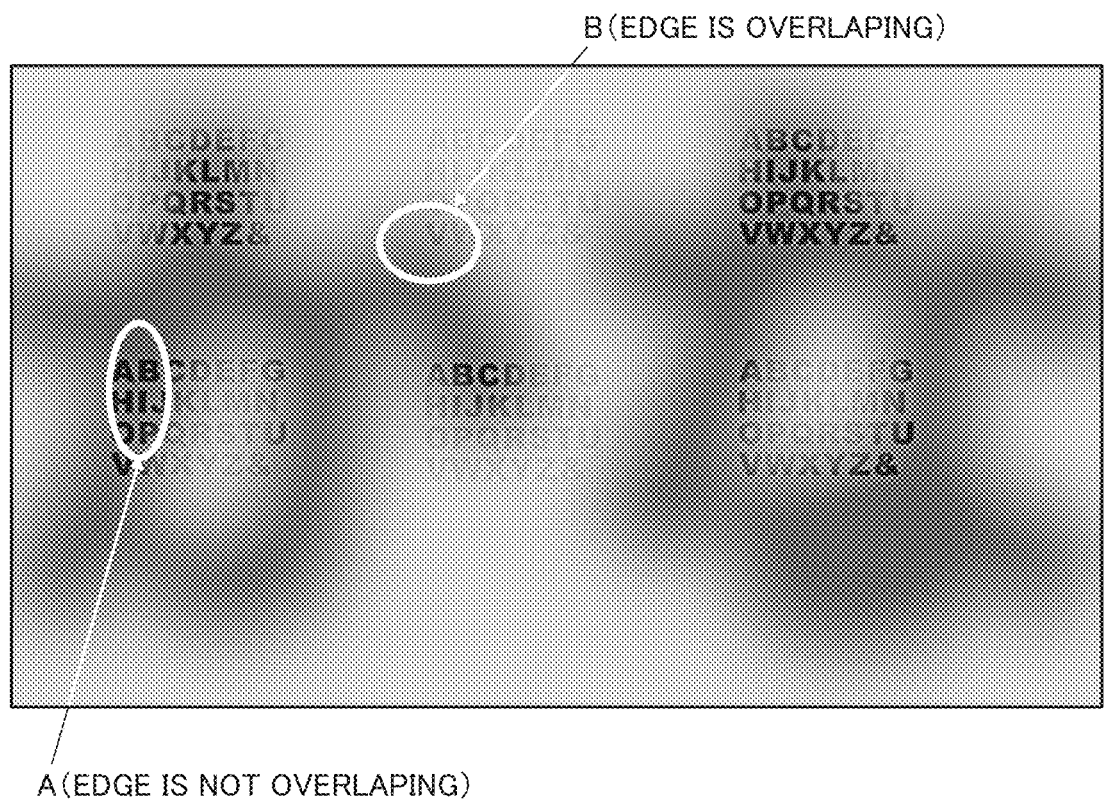
FIG. 5 is a diagram showing one example composite image according to a comparative example.

An image processing apparatus according to a comparative example combines a high-frequency image and a low-frequency image, without considering the composite position of the high-frequency image and the low-frequency image. FIG. 5 is one example composite image generated by the image processing apparatus according to the comparative example combining the high-frequency image and the low-frequency image. As shown in FIG. 5, the edge portion of the character " ✻ " in the low-frequency image and the high-frequency image do not overlap in a portion A. Accordingly, the viewer can easily perceive the portion A. However, the edge portion of the character " ✻ " in the low-frequency image and the high-frequency image overlap in a portion B. Accordingly, the viewer can hardly perceive the portion B.

As such, the image processing apparatus according to the comparative example does not consider the composite position of the high-frequency image and the low-frequency image, ending up generating a composite image having a portion that is hard for the viewer to perceive.

Figure 6:
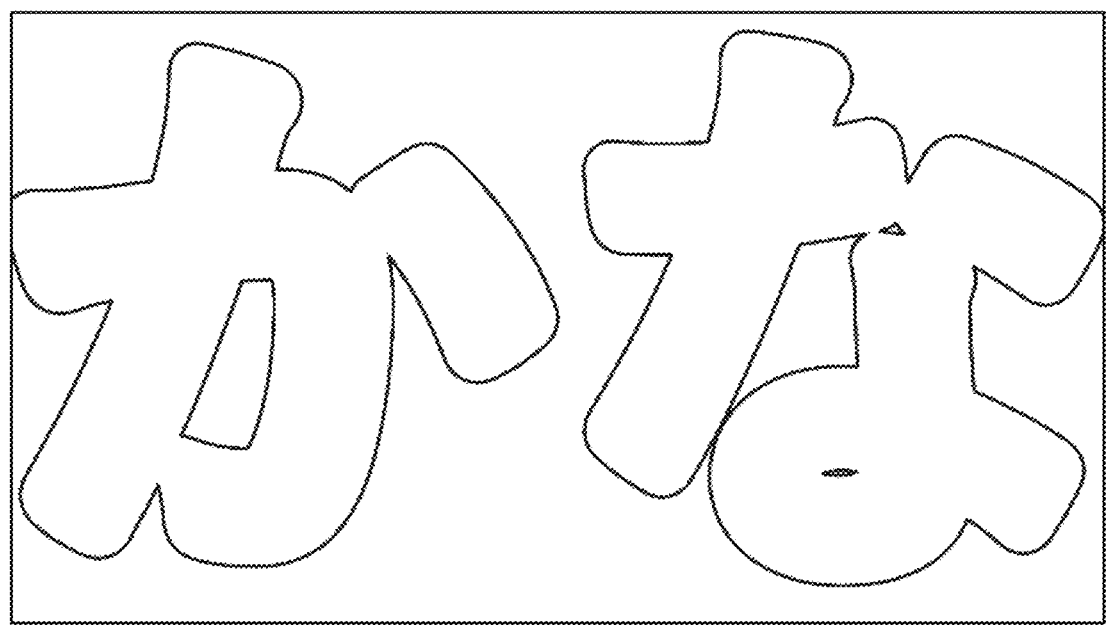
FIG. 6 is a diagram showing one example edge image.

In contrast, the image processing apparatus according to the present embodiment considers the composite position of the high-frequency image and the low-frequency image to combine the high-frequency image and the low-frequency image. The image processing apparatus according to the present embodiment extracts an image indicating edge portions of the far-away image of FIG. 2 from the far-away image. FIG. 6 is one example edge image indicating edge portions. The edges are portions of the image whose density is different from the rest. Thus, the edge is also referred to as a "density change portion." The image processing apparatus according to the present embodiment determines the composite position of the high-frequency image and the low-frequency image, based on the edge image and the close-up image. The composite position yields a small degree of overlap between the edge image and the close-up image. The image processing apparatus according to the present embodiment combines the high-frequency image and the low-frequency image at the determined composite position.

Figure 7:
FIG. 7 is a diagram showing one example composite image according to the present embodiment.

FIG. 7 is one example composite image generated by the image processing apparatus according to the present embodiment combining the high-frequency image and the low-frequency image. As shown in FIG. 7, according to the image processing apparatus of the present embodiment, the size (e.g., area) of the portions in which the edge portions of the low-frequency image and the high-frequency image overlap is small, as compared to the image processing apparatus according to the comparative example. Accordingly, the composite image generated by the image processing apparatus according to the present embodiment is easier for the viewer to perceive, as compared to the composite image generated by the image processing apparatus according to the comparative example.

Figure 8:
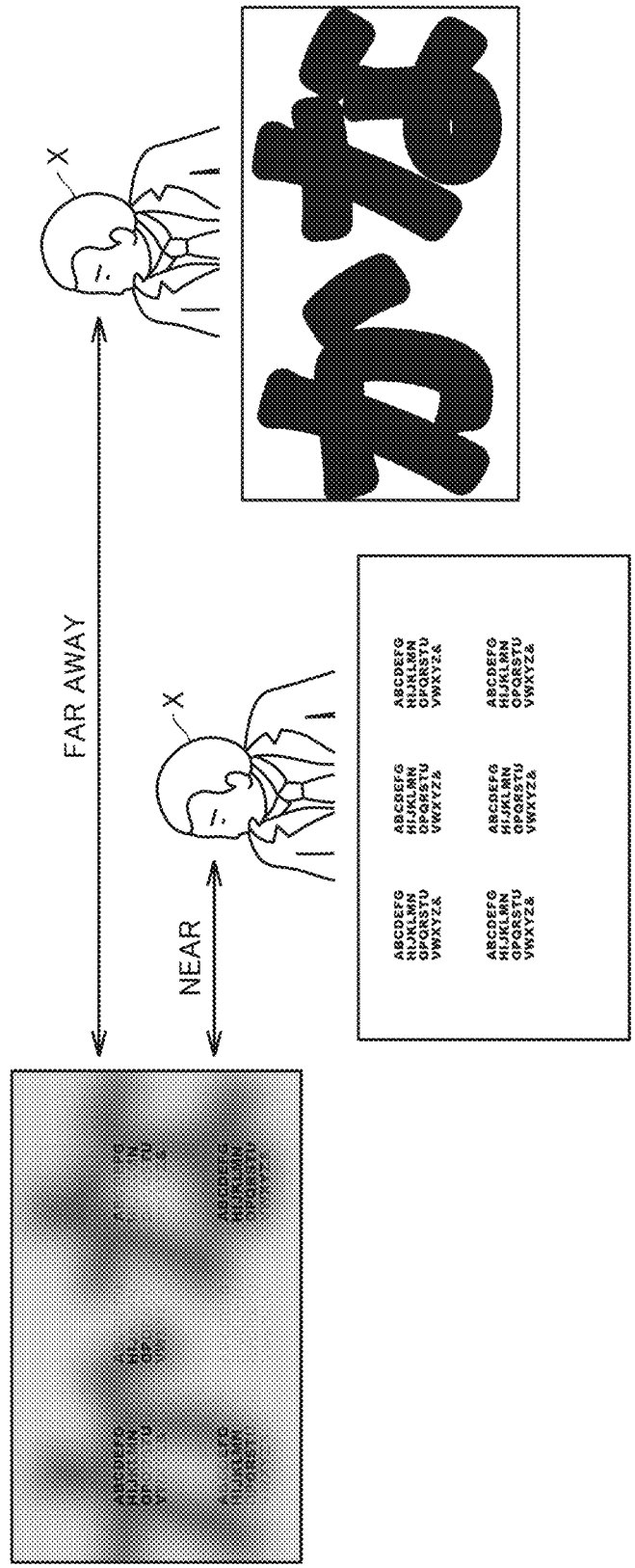
FIG. 8 is a diagram for illustrating the composite image.

FIG. 8 is a diagram showing how a paper having the composite image printed thereon is perceived by a viewer X from a distance and perceived by viewer X from near. As shown in FIG. 8, as the composite image is viewed by viewer X from a distance, viewer X can perceive the characters " ✻✻ " In contrast, as the composite image is viewed by viewer X from near, viewer X can perceive the characters "ABC . . . ," etc.

[Example Hardware Configuration of Image Processing Apparatus According to the Present Embodiment]

Figure 9:
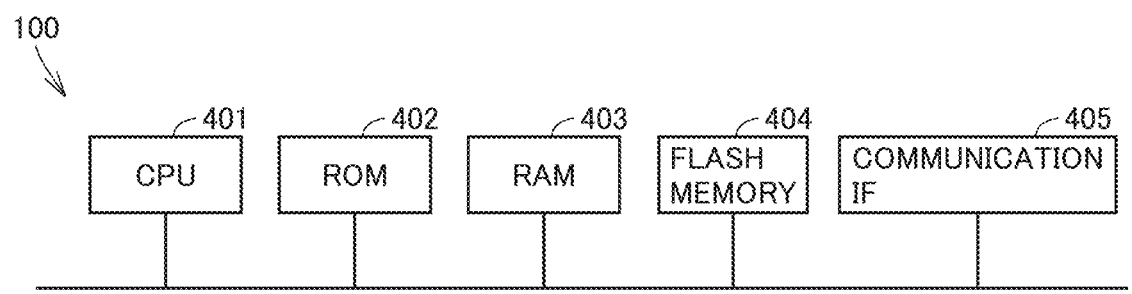
FIG. 9 is a diagram showing an example functional configuration of an image processing apparatus.

FIG. 9 is a diagram showing a hardware configuration of an image processing apparatus 100. Referring to FIG. 9, image processing apparatus 100 includes a central processing unit (CPU) 401 which executes programs, a read only memory (ROM) 402 which stores data in a non-volatile fashion, a random access memory (RAM) 403 which stores data in a volatile fashion, a flash memory 404, and a communication interface (IF) 405. For example, CPU 401, ROM 402, and RAM 403 correspond to a controller according to the present disclosure.

Flash memory 404 is a non-volatile semiconductor memory. Flash memory 404 stores the operating system and various programs which are executed by CPU 401, and various content and data. Flash memory 404 also stores various data in a volatile fashion, such as data generated by image processing apparatus 100 and data obtained from devices external to image processing apparatus 100.

CPU 401, ROM 402, RAM 403, flash memory 404, and communication IF 405 are interconnected by data buses.

Processes at image processing apparatus 100 are performed by respective hardware and CPU 401, ROM 402, and RAM 403, for example. Such software may be pre-stored in flash memory 404, etc. The software may also be stored in a storage medium, such as a memory card, and distributed as a program product. Alternatively, the software may be provided by, what is called, an information provider connected to the Internet, as a program product that can be downloaded. Such software is read from the storage medium by a reader for image processing apparatus 100 or downloaded via communication IF 405, and temporarily stored in flash memory 404. The software is read from flash memory 404 by CPU 401, and further stored into flash memory 404 in the form of an executable program. CPU 401 executes the program.

Note that the storage medium is not limited to a DVD-ROM, a CD-ROM, a flexible disk (FD), and a hard disk. The storage medium may be a medium fixedly bearing a program, such as a magnetic tape, a cassette tape, an optical disc (magnetic optical disc (MO)/Mini Disc (MD)/digital versatile disc (DVD)), or a semiconductor memory, such as an optical memory card, a mask ROM, an EPROM (Erasable Programmable Read Only Memory), an EEPROM (Electrically Erasable Programmable Read-Only Memory), and a flash ROM. The storage medium is a non-transitory medium from which the computer can read the program.

The program, as used herein, includes not only one that is directly executable by the CPU, but also source programs, compressed programs, encrypted programs, etc.

Image processing apparatus 100 may be implemented in, for example, a general purpose computer or a computer dedicated to image processing apparatus 100. The general purpose computer may be, for example, a personal computer (PC), a tablet, or a smartphone.

Moreover, the present embodiment discloses an image forming apparatus and a display apparatus which include image processing apparatus 100. A hardware configuration of the image forming apparatus is, for example, the hardware configuration shown in FIG. 9 that includes an image forming unit. The image forming unit forms an image on a recording medium (e.g., a paper). The image forming unit is configured of, for example, a photoreceptor. A hardware configuration of the display apparatus is, for example, the hardware configuration shown in FIG. 9 that includes a display unit. The display unit displays various images (a composite image described below). The display unit is, typically, a monitor or the like.

[Example Functional Configuration of Image Forming Apparatus 300]

Figure 10:
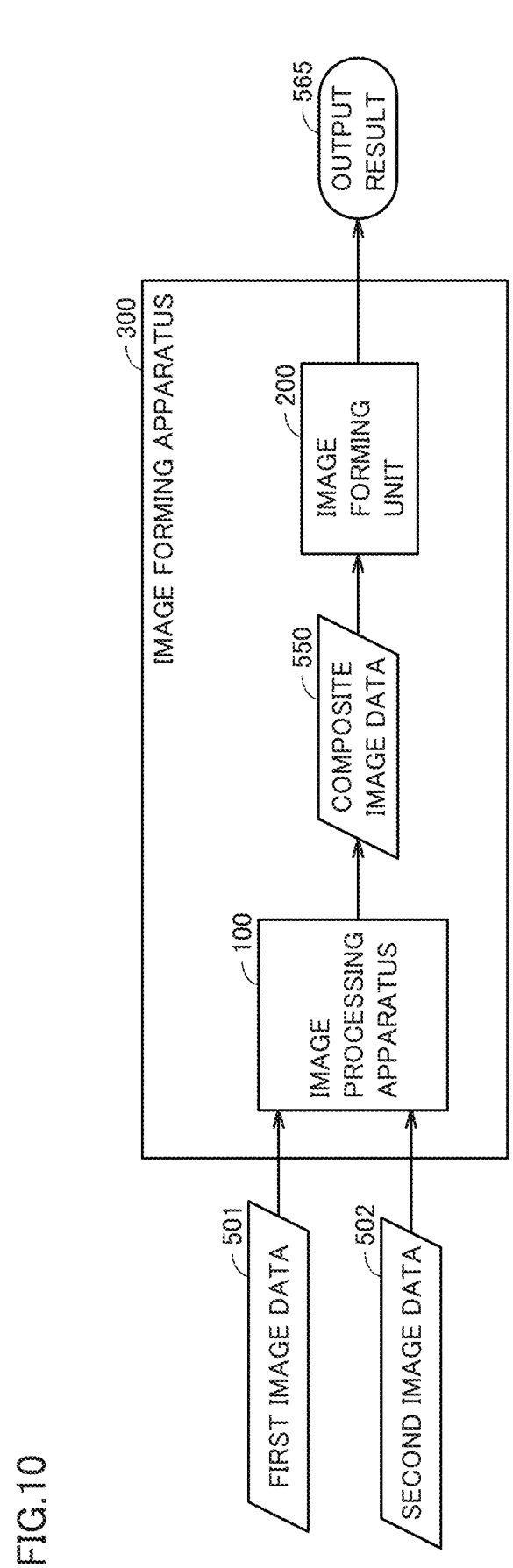
FIG. 10 is a diagram showing an example functional configuration of an image forming apparatus according to the present embodiment.

FIG. 10 is a diagram showing an example functional configuration of an image forming apparatus 300 according to the present embodiment. Image forming apparatus 300 according to the present embodiment includes image processing apparatus 100 and an image forming unit 200. For example, a user inputs first image data 501 and second image data 502 to image forming apparatus 300. First image data 501 is image data corresponding to a first image. First image data 501 is also image data corresponding to a close-up image. Second image data 502 is image data corresponding to a second image. Second image data 502 is also image data corresponding to a far-away image. First image data 501 and second image data 502 may be input to image forming apparatus 300 by, for example, the user transmitting them to image forming apparatus 300 via a network (not specifically shown) and communication IF 108. Image forming apparatus 300 receives the input of the transmitted first image data 501 and second image data 502. The user may store first image data 501 and second image data 502 into a storage medium and connect the storage medium to image forming apparatus 300. Image forming apparatus 300 receives input of first image data 501 and second image data 502 from the storage medium connected thereto.

Image processing apparatus 100 generates composite image data 550 from first image data 501 and second image data 502, and outputs composite image data 550. Image forming unit 200 forms a composite image based on composite image data 550 onto a recording medium, and outputs the recording medium having the composite image formed thereon as an output result 565. The recording medium is, for example, a paper or a sheet.

Note that the "image data" may be referred to simply as an "image" in the present embodiment. For example, first image data 501 is also referred to as the "first image," second image data 502 is also referred to as the "second image," and composite image data 550 is also referred to as the "composite image." Moreover, the "image" is also referred to as "the image corresponding to the image data." The "image data" is also referred to as "the image data corresponding to the image."

[Processing by Image Processing Apparatus 100]

Figure 11:
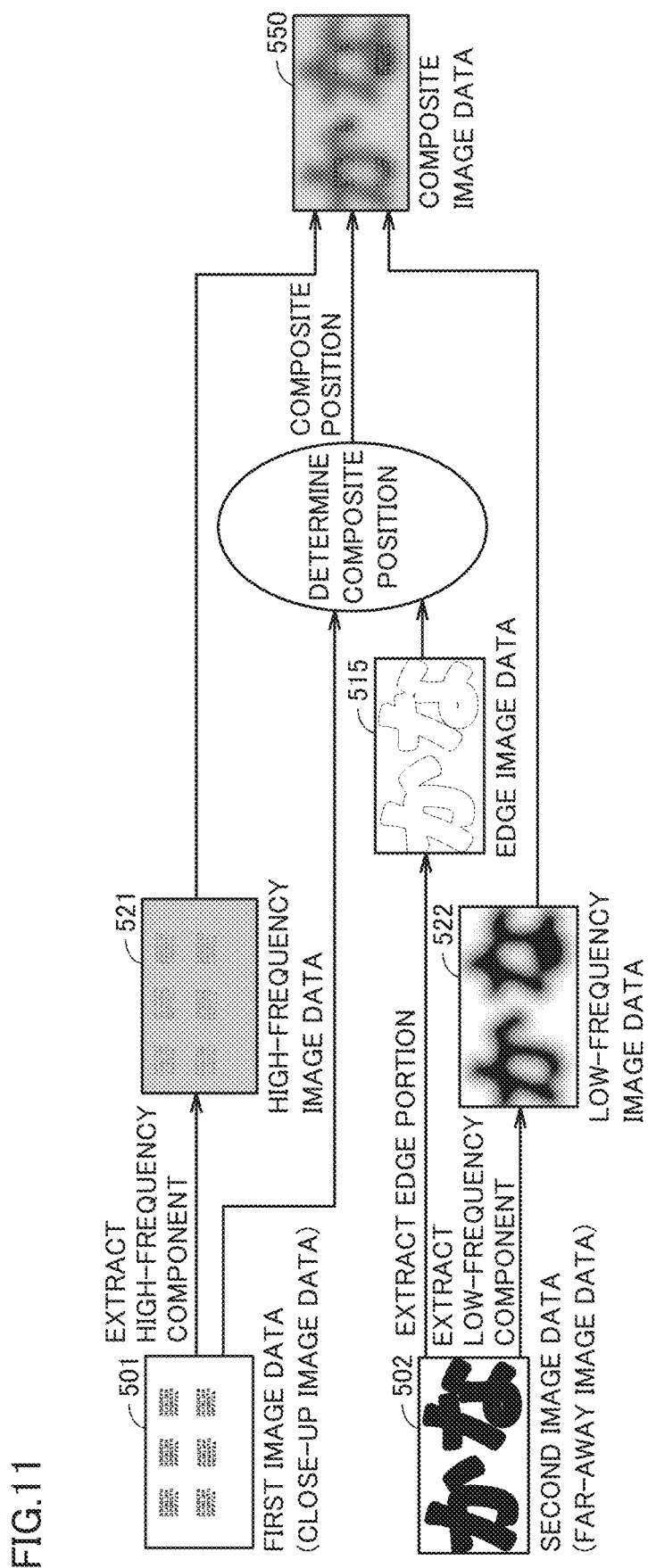
FIG. 11 is a diagram showing data, etc. included in an image according to the present embodiment.

FIG. 11 is a diagram showing a flow of an image (image data) processed by image processing apparatus 100 according to the present embodiment. As shown in FIG. 11, image processing apparatus 100 extracts a high-frequency component from first image data 501. The image corresponding to first image data 501 is, for example, the image shown in FIG. 1. An image (high-frequency image) corresponding to the high-frequency component extracted from first image data 501 is the diagram shown in FIG. 3.

Image processing apparatus 100 also extracts a low-frequency component from second image data 502. The image corresponding to second image data 502 is, for example, the image shown in FIG. 2. An image (the low-frequency image) corresponding to the low-frequency component extracted from second image data 502 is the diagram shown in FIG. 4.

Image processing apparatus 100 extracts edge portions from first image data 501. An image (the edge image) corresponding to the extracted edge portions is the diagram shown in FIG. 6. Image processing apparatus 100 determines a composite position from the high-frequency image and the edge image. Image processing apparatus 100 then combines the high-frequency image (high-frequency image data 521) and the low-frequency image (low-frequency image data 522) so that the composite position of the high-frequency image and the low-frequency image is the determined composite position. This generates the composite image (composite image data 550) shown in FIG. 7.

[Example Functional Configuration of Image Processing Apparatus 100]

Figure 12:
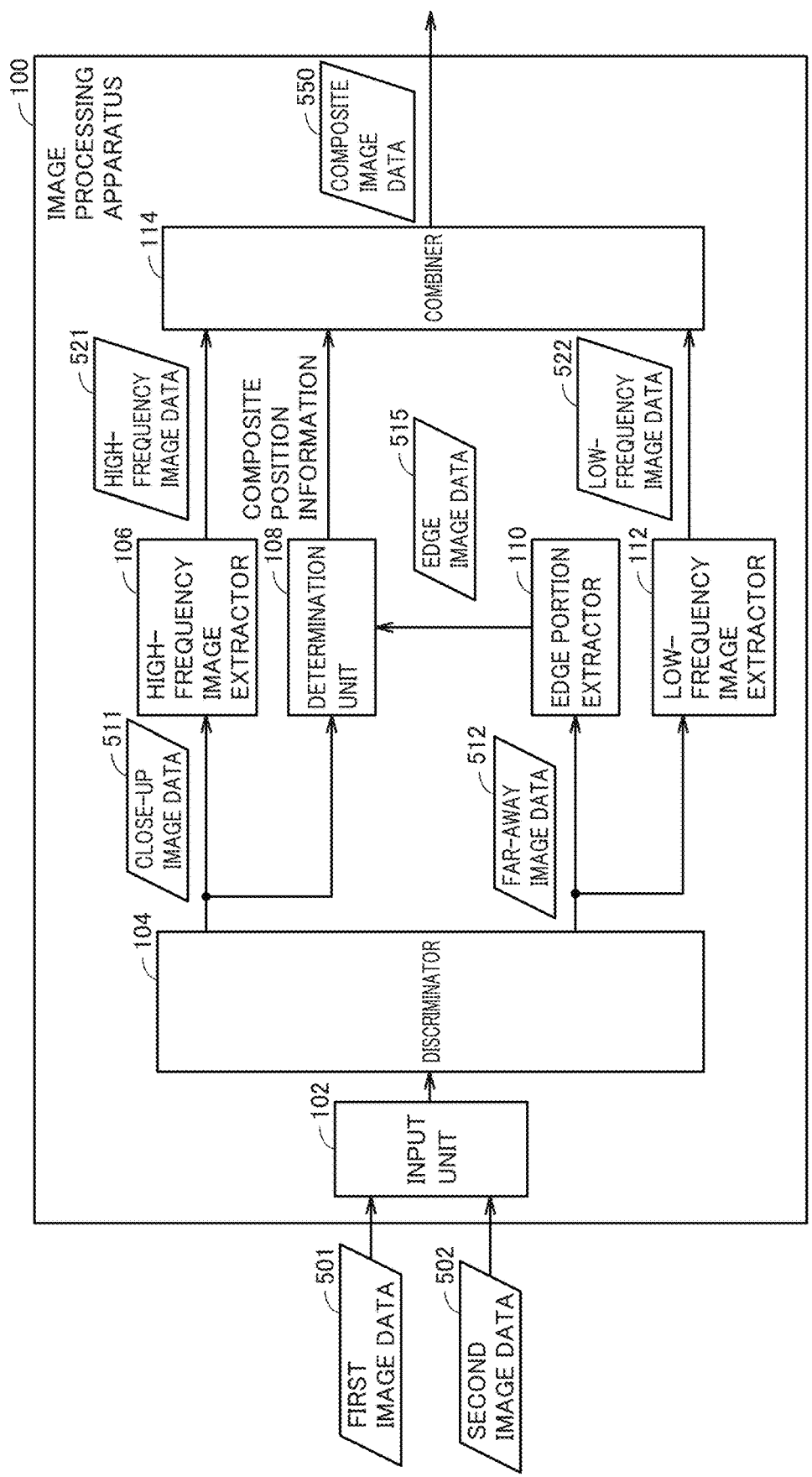
FIG. 12 is an example functional configuration of the image processing apparatus according to the present embodiment.

FIG. 12 is a diagram showing an example functional configuration of image processing apparatus 100 according to the present embodiment. Image processing apparatus 100 has functions as an input unit 102, a discriminator 104, a high-frequency image extractor 106, determination unit 108, an edge portion extractor 110, a low-frequency image extractor 112, and a combiner 114. In the present disclosure, high-frequency image extractor 106 corresponds to a "first extraction unit." In the present disclosure, low-frequency image extractor 112 corresponds to a "second extraction unit." In the present disclosure, edge portion extractor 110 corresponds to a "third extraction unit."

Initially, input unit 102 receives first image data 501 (first image) input to image forming apparatus 300 and second image data 502 input to image forming apparatus 300.

Next, discriminator 104 discriminates which one of the input first image data 501 and second image data 502 is close-up image data 511, and which one of the input first image data 501 and second image data 502 is far-away image data 512. As shown in FIGS. 1 and 2, generally, viewer X can easily perceive from a distance a character that is large in size, and viewer X can easily perceive from near a character that is small in size. Thus, discriminator 104 determines the image of characters that are small in size as a close-up image (the image corresponding to close-up image data 511), and the image of characters that are large in size as a far-away image (the image corresponding to far-away image data 512).

For example, discriminator 104 analyzes first image data 501 and second image data 502 to obtain a first average of the sizes of one or more characters included in the first image corresponding to first image data 501, and a second average of the sizes of one or more characters included in the second image corresponding to second image data 502. The "character size" is, typically, the area of the characters. Discriminator 104 compares the first average and the second average. If discriminator 104 determines that the first average is greater than the second average, discriminator 104 discriminates first image data 501 corresponding to the first average as far-away image data, and second image data 502 corresponding to the second average as a close-up image. If discriminator 104 compares the first average and the second average and determines that the second average is greater than the first average, discriminator 104 discriminates first image data 501 corresponding to the first average as close-up image data, and second image data 502 corresponding to the second average as a far-away image.

Note that, as a variation, discriminator 104 may employ a configuration in which discriminator 104 obtains a first summation value, which is a summation value of all the characters included in the image corresponding to first image data 501, and a second summation value, which is a summation value of all the characters included in the image corresponding to second image data 502.

If such a configuration is employed, and discriminator 104 compares the first summation value and the second summation value and determines that the first summation value is greater than the second summation value, discriminator 104 discriminates first image data 501 corresponding to the first summation value as far-away image data, and second image data 502 corresponding to the second summation value as a close-up image. If discriminator 104 compares the first summation value and the second summation value and determines that the second summation value is greater than the first summation value, discriminator 104 discriminates first image data 501 corresponding to the first summation value as close-up image data, and second image data 502 corresponding to the second summation value as a far-away image.

As a variation, discriminator 104 may employ a configuration in which discriminator 104 obtains the size of a first representative character among all the characters included in the image corresponding to first image data 501, and the size of a second representative character among all the characters included in the image corresponding to second image data 502.

If such a configuration is employed, and discriminator 104 compares the size of the first representative character and the size of the second representative character and determines that the size of the first representative character is greater than the size of the second representative character, discriminator 104 discriminates the first image data 501 corresponding to the size of the first representative character as far-away image data, and second image data 502 corresponding to the size of the second representative character as a close-up image. If discriminator 104 compares the size of the first representative character and the size of the second representative character and determines that the size of the second representative character is greater than the size of the first representative character, discriminator 104 discriminates second image data 502 corresponding to the size of the second representative character as far-away image data, and first image data 501 corresponding to the size of the first representative character as a close-up image.

The example of FIG. 12 shows a case in which discriminator 104 discriminates first image data 501 as close-up image data 511, and discriminates second image data 502 as far-away image data 512. An image corresponding to close-up image data 511 is the image shown in FIG. 1. An image corresponding to far-away image data 512 is the image shown in FIG. 2.

Close-up image data 511 is input to high-frequency image extractor 106 and determination unit 108. High-frequency image extractor 106 extracts high-frequency image data 521. High-frequency image data 521 is high-frequency component image data included in close-up image data 511. High-frequency image extractor 106, for example, applies a filter, for extracting high-frequency component image data, to close-up image data 511 and extracts high-frequency image data 521. An image corresponding to high-frequency image data 521 is the image of FIG. 3.

Far-away image data 512 is input to edge portion extractor 110 and low-frequency image extractor 112. Edge portion extractor 110 extracts edge image data 515 corresponding to edge portions from far-away image data 512. An image corresponding to edge image data 515 is the diagram shown in FIG. 6. Low-frequency image extractor 112, for example, passes far-away image data 512 through a filter, for extracting low-frequency component image data, and extracts low-frequency image data 522.

Determination unit 108 determines a composite position of the high-frequency image and the low-frequency image, based on edge image data 515 and close-up image data 511. Here, the composite position is a position so that a degree of overlap between edge portions of a far-away image and a high-frequency image is small when the high-frequency image and the low-frequency image are formed on a recording medium. The composite position may be a position of the low-frequency image relative to the high-frequency image. The composite position may be a position of the high-frequency image relative to the low-frequency image. The composite position may be a relative position between the high-frequency image and the low-frequency image. Determination unit 108 outputs the composite position information indicative of the determined composite position to combiner 114.

Combiner 114 combines high-frequency image data 521 corresponding to the high-frequency image and low-frequency image data 522 corresponding to the low-frequency image so that the composite position of the high-frequency image and the low-frequency image is based on the composite position information output from determination unit 108, thereby generating composite image data 550. Combiner 114 outputs composite image data 550.

[Processing by Determination Unit]

Figure 13:
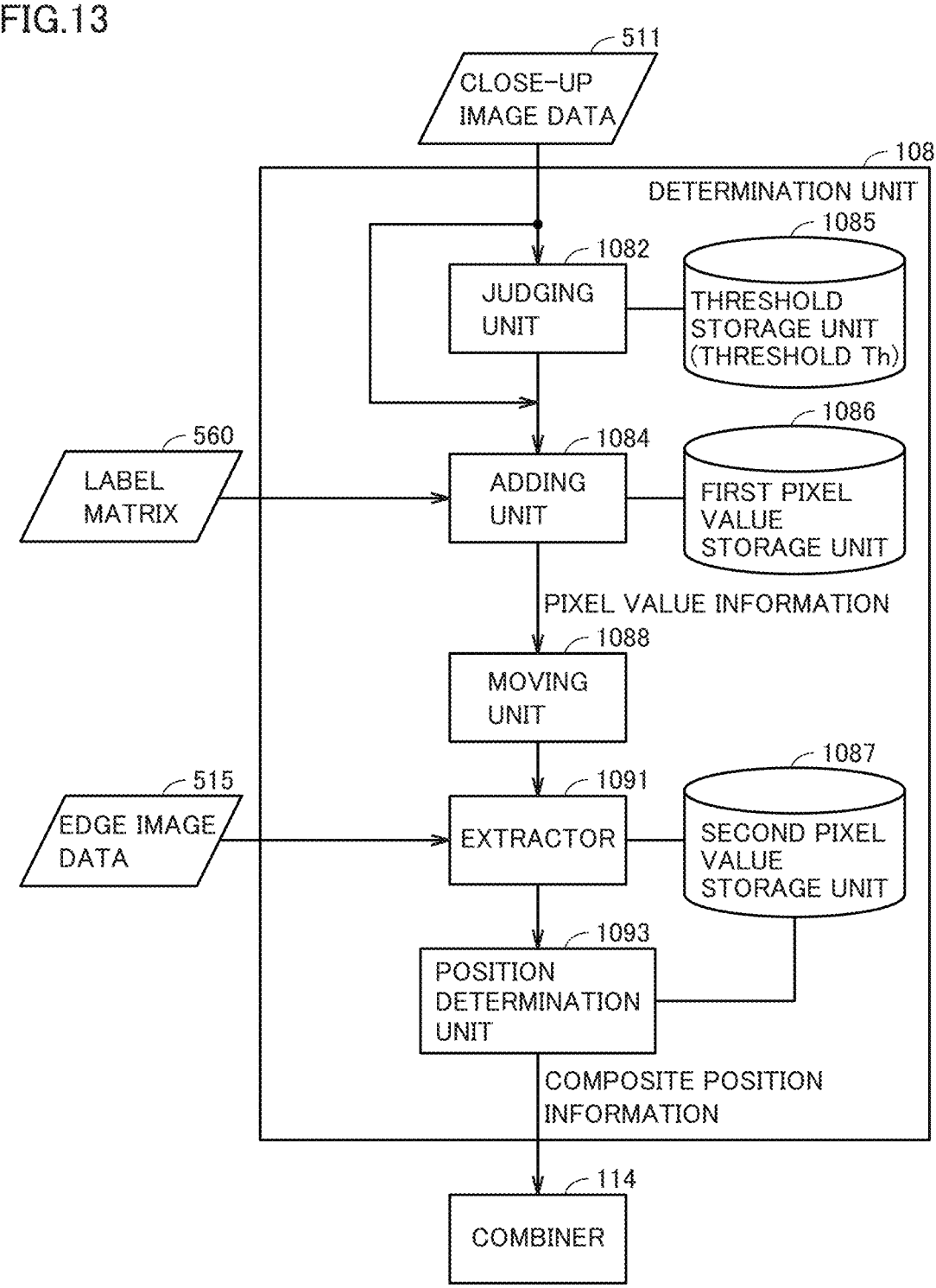
FIG. 13 is a diagram showing an example functional configuration of a determination unit according to the present embodiment.

Next, processing by determination unit 108 will be described. FIG. 13 is a diagram showing an example functional configuration of determination unit 108. Determination unit 108 has functions as a judging unit 1082, an adding unit 1084, a moving unit 1088, an extractor 1091, a position determination unit 1093, a threshold storage unit 1085, a first pixel value storage unit 1086, and a second pixel value storage unit 1087. A threshold Th, described below, is pre-stored in threshold storage unit 1085. A pixel value which is added to the pixel of interest by adding unit 1084 is stored in first pixel value storage unit 1086. Threshold storage unit 1085 and first pixel value storage unit 1086 are configured of ROM 402, for example.

As also shown in FIG. 12, close-up image data 511 is input to determination unit 108. As close-up image data 511 is input to judging unit 1082 included in determination unit 108, judging unit 1082, for example, converts close-up image data 511 into a histogram. Based on the histogram, judging unit 1082 counts a total number of first-color pixels among all the pixels of the close-up image corresponding to close-up image data 511. Here, the "first-color pixel" is a pixel that has a color among all the pixels of the close-up image. In the present embodiment, the color refers to, for example, a color (e.g., black) obtained by combining red-green-blue (RGB) colors in any proportions. In the close-up image, a white pixel refers to a "first non-color pixel," for example.

Judging unit 1082 determines whether the total number of first-color pixels included in the close-up image is greater than threshold Th. Here, threshold Th is, for example, a value obtained by dividing a total number of pixels of the close-up image by a predetermined number (e.g., 2). Note that threshold Th may be any other number.

The total number of first-color pixels of a close-up image determined by determination unit 108 as being greater than or equal to threshold Th indicates that the total number of first-color pixels of the close-up image is relatively large. In this case, determination unit 108 determines the composite position by a first approach. The first approach will be described below. Determination unit 108 overlaps a close-up image with an edge image and counts a degree overlap between the two. The overlapping degree is, for example, a total number of pixels that are overlapping between the close-up image and the edge image. When counting the overlapping degree, determination unit 108 also obtains the location of the edge image (X coordinate, Y coordinate) relative to the close-up image. Determination unit 108 stores the overlapping degree and the location of the edge image, which is obtained when the overlapping degree is counted, in association into a given storage area (e.g., RAM 403).

Determination unit 108 shifts the close-up image by one pixel in the X-coordinate direction or the Y-coordinate direction, overlaps the close-up image and the edge image, again, counts a degree of overlap between the close-up image and the edge image and obtains the location of the edge image when the overlapping degree is counted, and stores the overlapping degree and the location of the edge image in association into the given storage area. This allows determination unit 108 to store into the storage area the overlapping degree and the location of the edge image for every pattern of overlap between the close-up image and the edge image. Subsequently, determination unit 108 extracts the smallest overlapping degree among all the overlapping degrees stored, and extracts the location of the edge image corresponding to the smallest overlapping degree. This location of the edge image is a composite position which yields a smallest degree of overlap between the high-frequency image and the low-frequency image. Determination unit 108 outputs the composite position.

Next, the case is described where determination unit 108 determines that the total number of first-color pixels included in the close-up image is less than threshold Th. In this case, determination unit 108 determines the composite position by a second approach. In the second approach, the computations by determination unit 108 can be reduced, as compared to the first approach. The second approach will be described below.

In the second approach, determination unit 108 uses a label matrix 560 to determine the composite position. FIG. 14 is a diagram showing one example of label matrix 560. Determination unit 108 applies label matrix 560 to a close-up image, thereby generating pixel value information. The pixel value information is used to reduce the computations by determination unit 108 when determining a composite position of a high-frequency image and a low-frequency image which yields a smallest degree of overlap between the high-frequency image and the low-frequency image.

Note that, as a variation, determination unit 108 may generate the pixel value information by moving the close-up image while label matrix 560 is fixed. In other words, determination unit 108 may generate the pixel value information by moving the position of the close-up image relative to label matrix 560.

Label matrix 560 is configured of multiple cells. In the example of FIG. 14, label matrix 560 includes five cells in the X-axis direction and seven cells in the Y-axis direction, that is, 5×7 of 35 cells. One cell corresponds to one pixel of the close-up image.

Thirty five cells of FIG. 14 are each assigned with an identification number. In the example of FIG. 14, the identification numbers are listed in parentheses. In the example of FIG. 14, the identification numbers 1, 2, 3, . . . 34, and 35 are assigned to the cells in the order from upper left to lower right. The center cell is defined for label matrix 560. The center cell is one that is located at the center among the 5×7 of 35 cells. In the example of FIG. 14, the center cell is indicated by the thick box and the identification number of which is "18."

In the following, the cells of label matrix 560 are represented by "cell identification numbers." For example, the cell having the identification number "18" will be represented as "cell 18." Each cell included in label matrix 560 is associated with a pixel value. The pixel value is a pixel value that can be added to a pixel of the close-up image by adding unit 1084. In the example of FIG. 14, for example, the cell 18 (referred to as the center cell) has a pixel value specified by a largest value "4." The farther away from the center cell, the lower value the pixel value is specified by. For example, first adjacent cells (cell 12, cell 13, cell 14, cell 17, cell 19, cell 22, cell 23, cell 24) adjacent to the center cell have a pixel value specified by "3" which is less than the pixel value "4."

Furthermore, second adjacent cells (cell 6, cell 7, cell 8, cell 9, cell 10, cell 11, cell 15, cell 16, cell 20, cell 21, cell 25, cell 26, cell 27, cell 28, cell 29, cell 30) adjacent to the first adjacent cells have a pixel value specified by "2" which is less than the pixel value "3."

Furthermore, third adjacent cells (cell 1, cell 2, cell 3, cell 4, cell 5, cell 31, cell 32, cell 33, cell 34, cell 35) adjacent to the second adjacent cells have a pixel value specified by "1" which is less than the pixel value "2."

In the present embodiment, adding unit 1084 applies label matrix 560 to the close-up image so that a pixel of interest, which is one of the pixels of the close-up image (close-up image data 511), coincides with the center cell of label matrix 560. If determined that the pixel of interest is a first-color pixel, adding unit 1084 adds a pixel value to the pixel of interest.

FIGS. 15A to 15E are schematic diagrams of the close-up image having label matrix 560 applied thereto. In the examples of FIGS. 15A to 15E, for ease of explanation, the close-up image is a 13×13 pixels image. In the examples of FIGS. 15A to 15E, for ease of explanation, the pixel at the coordinates (3, 10) and the pixel at the coordinates (3, 11) of the close-up image are first-color pixels, and the rest are not first-color pixels (hereinafter, a "non-first-color pixel"). In FIGS. 15A to 15E, the first-color pixels are hatched pixels, and the non-first-color pixels are non-hatched pixels. In FIGS. 15A to 15E, the frame of label matrix 560 and the center cell of label matrix 560 are indicated by a thick box.

As shown in FIG. 15A, using the initial pixel of the close-up image as the pixel of interest, adding unit 1084 applies label matrix 560 to the close-up image so that the pixel of interest coincides with the center cell of label matrix 560. Here, the initial pixel is, for example, the pixel at (1, 1) of the close-up image. Adding unit 1084 determines whether the pixel of interest is a first-color pixel. If determined that the pixel of interest is a first-color pixel, adding unit 1084 adds a pixel value to the pixel of interest. On the other hand, if determined that the pixel of interest is not a first-color pixel, adding unit 1084 adds no pixel value to the pixel of interest. Stated differently, adding unit 1084 generates information (hereinafter, referred to also as "null information") for the pixel of interest, the information indicating that no pixel value is added to the pixel of interest (a pixel that is not a first-color pixel). In the example of FIG. 15A, the pixel of interest is not a first-color pixel and thus adding unit 1084 adds no pixel value thereto. In the following, "the process of determining as to whether the pixel of interest is the first-color pixel," and "the add process of adding a pixel value to the pixel of interest upon the determination that the pixel of interest is a color pixel" by adding unit 1084 will be collectively referred to as a "pixel process."

Next, the coordinates of the pixel of interest is incremented by "1" in the X-coordinate direction. In other words, the next pixel of interest is the pixel at (2, 1). Adding unit 1084 performs "the pixel process" on this pixel of interest. If the X-coordinate value of the pixel of interest is at the maximum, the X-coordinate value is returned to the initial value ("1" in the present embodiment) and the Y-coordinate value is incremented by "1." In other words, adding unit 1084 shifts the coordinates of the pixel of interest in the examples of FIGS. 15A to 15E in order from (1, 1) to (1, 2), . . . (1, 13), (2, 1), (2, 2), (2, 3) . . . (2, 13), (3, 1), (3, 2), (3, 3) . . . (13, 12), and (13, 13), and performs the pixel process on pixels of interest (169 pixels) at the respective pair of coordinates. Each pixel of the close-up image includes no pixel value prior to the performance of the pixel process.

FIG. 15B is a diagram showing the close-up image having label matrix 560 applied thereto in which the pixel of interest is the pixel at (9, 5). In the example of FIG. 15B, the pixel of interest is not a first-color pixel and thus no pixel value is added to the pixel of interest.

FIG. 15C is a diagram showing the close-up image having label matrix 560 applied thereto in which the pixel of interest is the pixel at (3, 10). As shown in FIG. 15C, a pixel of interest 511F at (3, 10) is a first-color pixel, and thus adding unit 1084 performs the add process on pixel of interest 511F. As shown in FIG. 15C, adding unit 1084 adds "4" as a first pixel value to pixel of interest 511F.

Adding unit 1084 also adds "3" as a second pixel value to the first adjacent pixels adjacent to pixel of interest 511F. The first adjacent pixels in FIG. 15C are eight pixels at (2, 11), (3, 11), (4, 11), (2, 10), (4, 10), (2, 9), (3, 9), and (4, 9). The second pixel value is smaller than the first pixel value.

Adding unit 1084 also adds "2" as a third pixel value to the second adjacent pixels adjacent to the first adjacent pixels. The second adjacent pixels in FIG. 15C are the pixels at (1, 12), (2, 12), (3, 12), (4, 12), (5, 12), (1, 11), (5, 11), (1, 10), (5, 10), (1, 9), (5, 9), (1, 8), (2, 2), (3, 8), (4, 8), and (5, 8). The third pixel value is smaller than the second pixel value.

Adding unit 1084 also adds "1" as a fourth pixel value to the third adjacent pixels adjacent to the second adjacent pixels. The third adjacent pixels in FIG. 15C are the pixels at (1, 13), (2, 13), (3, 13), (4, 13), (5, 13), (1, 7), (2, 7), (3, 7), (4, 7), and (5, 7). The fourth pixel value is smaller than the third pixel value.

The pixel value added by adding unit 1084 and the coordinates of the pixel having the pixel value added thereto are stored in association into first pixel value storage unit 1086. In the example of FIG. 15C, the coordinates (1, 13), the coordinates (2, 13), the coordinates (3, 13), the coordinates (4, 13), the coordinates (5, 13), the coordinates (1, 7), the coordinates (2, 7), the coordinates (3, 7), the coordinates (4, 7), and the coordinates (5, 7) are each stored in association with the pixel value "1" into first pixel value storage unit 1086.

In the example of FIG. 15C, the coordinates (1, 12), the coordinates (2, 12), the coordinates (3, 12), the coordinates (4, 12), the coordinates (5, 12), the coordinates (1, 11), the coordinates (5, 11), the coordinates (1, 10), the coordinates (5, 10), the coordinates (1, 9), the coordinates (5, 9), the coordinates (1, 8), the coordinates (2, 2), the coordinates (3, 8), the coordinates (4, 8), and the coordinates (5, 8) are each stored in association with the pixel value "2" into first pixel value storage unit 1086.

In the example of FIG. 15C, the coordinates (2, 11), the coordinates (3, 11), the coordinates (4, 11), the coordinates (2, 10), the coordinates (4, 10), the coordinates (2, 9), the coordinates (3, 9), and the coordinates (4, 9) are each stored in association with the pixel value "3" into first pixel value storage unit 1086.

In the example of FIG. 15C, the coordinates (3, 10) and the pixel value "4" are stored in association into first pixel value storage unit 1086.

Next, adding unit 1084 increments the coordinates of the pixel of interest by "1" in the X-coordinate direction, thereby setting the pixel at (4, 10) to the pixel of interest, as shown in FIG. 15D. In the case of FIG. 15D, adding unit 1084 adds "4" as the first pixel value to the pixel value (=3) of the pixel of interest (4, 10) stored in first pixel value storage unit 1086.

Adding unit 1084 also adds "3" as the second pixel value to first adjacent pixels adjacent to the pixel of interest at (3, 5). The first adjacent pixels in FIG. 15D are the eight pixels at the coordinates (3, 11), (4, 11), (5, 11), (3, 10), (5, 10), (3, 9), (4, 9), and (5, 9). The add process of FIG. 15C has already added the pixel value "2" to, for example, the pixel at (5, 11). Accordingly, the add process of FIG. 15D adds "3" to the pixel value "2" of the pixel at (5, 11).

Adding unit 1084 also adds "2" as the third pixel value to the second adjacent pixels adjacent to the first adjacent pixels. The second adjacent pixels in FIG. 15D are the pixels at (2, 12), (3, 12), (4, 12), (5, 12), (6, 12), (2, 11), (6, 11), (2, 10), (6, 10), (2, 9), (6, 9), (2, 8), (3, 2), (4, 8), (5, 8), and (6, 8). The add process of FIG. 15C has already added the pixel value "2" to, for example, the pixel at (5, 12). Accordingly, the add process of FIG. 15D adds "2" to the pixel value "2" of the pixel at (5, 12).

Adding unit 1084 also adds "1" as the fourth pixel value to the third adjacent pixels adjacent to the second adjacent pixels. The third adjacent pixels in FIG. 15C are the pixels at (2, 13), (3, 13), (4, 13), (5, 13), (6, 13), (2, 7), (3, 7), (4, 7), (5, 7), and (6, 7). The add process of FIG. 15C has already added the pixel value "1" to, for example, the pixel at (5, 13). Accordingly, add process of FIG. 15D adds "1" to the pixel value "1" of the pixel at (5, 13).

FIG. 15D is a diagram showing the close-up image before the add process shown in FIG. 15D is performed thereon (the close-up image prior to calculation). FIG. 15E is a diagram showing the close-up image after the add process shown in FIG. 15D is performed thereon (the close-up image after the calculation).

In the example of FIG. 15E, the coordinates (1, 7), the coordinates (1, 13), the coordinates (6, 7), and the coordinates (6, 13) are each stored in association with the pixel value "1" into first pixel value storage unit 1086.

In the example of FIG. 15E, the coordinates (2, 13), the coordinates (3, 13), the coordinates (4, 13), the coordinates (5, 13), the coordinates (1, 12), the coordinates (6, 12), the coordinates (1, 11), the coordinates (6, 11), the coordinates (1, 10), the coordinates (6, 10), the coordinates (1, 9), the coordinates (6, 9), the coordinates (1, 8), the coordinates (6, 8), the coordinates (2, 7), the coordinates (3, 7), the coordinates (4, 7), and the coordinates (5, 7) are each stored in association with the pixel value "2" into first pixel value storage unit 1086.

In the example of FIG. 15E, the coordinates (2, 12), the coordinates (3, 12), the coordinates (4, 12), the coordinates (5, 12), the coordinates (2, 8), the coordinates (3, 8), the coordinates (4, 8), and the coordinates (5, 8) are each stored in association with the pixel value "4" into first pixel value storage unit 1086.

In the example of FIG. 15E, the coordinates (2, 11), the coordinates (5, 11), the coordinates (2, 10), the coordinates (5, 10), the coordinates (2, 9), and the coordinates (5, 9) are each stored in association with the pixel value "5" into first pixel value storage unit 1086.

In the example of FIG. 15E, the coordinates (3, 11), the coordinates (4, 11), the coordinates (3, 9), and the coordinates (4, 9) are each stored in association with the pixel value "6" into first pixel value storage unit 1086.

In the example of FIG. 15E, the coordinates (3, 10) and the coordinates (4, 10) are each stored in association with the pixel value "7" into first pixel value storage unit 1086.

Adding unit 1084 applies label matrix 560 to the close-up image so that every one of pixels (169 pixels) of the close-up image is set to the pixel of interest, and performs the pixel process on the pixel. The information that is stored in first pixel value storage unit 1086 after the completion of the pixel process on every one of pixels (169 pixels) of the close-up image will be referred to as "pixel value information." The pixel value information for the close-up image of FIG. 15A is shown in FIG. 15E.

For coordinates having no pixel value added thereto (e.g., coordinates having a pixel value "0", such as the coordinates (8, 6)), null information is stored in the pixel value information.

Next, moving unit 1088 shifts (moves) the relative position of the edge image and the pixel value information by one pixel each time so that the pixels of the edge image coincide with the pixels in the pixel value information. In the present embodiment, moving unit 1088 shifts the edge image by one pixel each time, relative to the pixel value information. Note that, as a variation, moving unit 1088 may shift the pixel value information by one pixel each time, relative to the edge image. In other words, moving unit 1088 may shift the relative position of the pixel value information and the edge image by one pixel each time.

Figure 16:
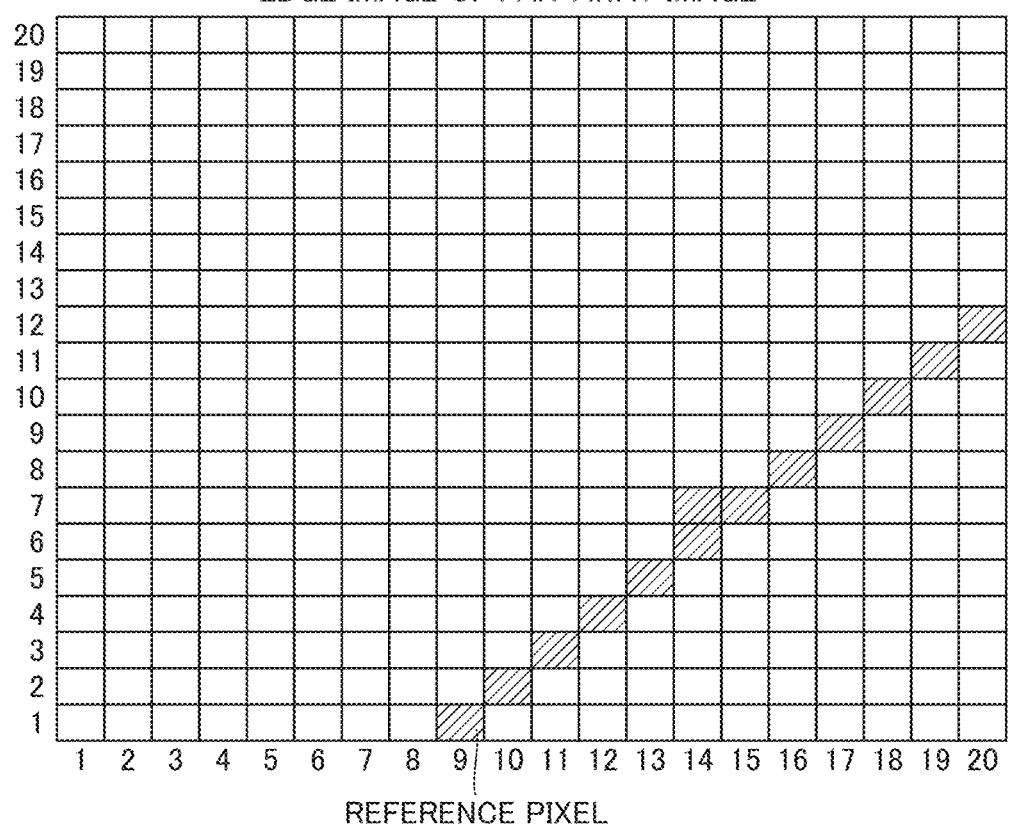
FIG. 16 is a diagram showing one example edge image of a far-away image.

FIG. 16 is one example edge image. Note that the edge image of FIG. 16 is an image of a portion of the edge image of FIG. 6, for example. In the example of FIG. 16, for ease of explanation, the edge image is a 20×20 pixels image. In the example of FIG. 16, for ease of explanation, the pixels at (9, 1), (10, 2), (11, 3), (12, 4), (13, 5), (14, 6), (14, 7), (15, 7), (16, 8), (17, 9), (18, 10), (19, 11), and (20, 12) are second-color pixels which have a color. The pixels at other coordinates are "second non-color pixels" which have no color. In the example of FIG. 16, the second-color pixel are hatched pixels, and the second non-color pixel are non-hatched pixels. An arbitrary pixel among all the second-color pixels of the edge image is determined as a "reference pixel." In the example of FIG. 16, suppose that the pixel at the coordinates (9, 1) is the reference pixel.

In the present embodiment, moving unit 1088 shifts the edge image by one pixel each time, relative to the pixel value information (without shifting the pixel value information) so that every pixel in the pixel value information coincides with the reference pixel of the edge image. For example, the reference pixel of the edge image is applied to the coordinates (1, 1) in the pixel value information so that the reference pixel of the edge image coincides with the coordinates (1, 1). Extractor 1091 extracts a pixel value of every pixel in the pixel value information that coincides with the second-color pixels among all the pixels of the edge image. Extractor 1091 extracts no pixel value of a pixel whose null information has been generated.

Note that, as a variation, moving unit 1088 may shift the pixel value information by one pixel each time, relative to the edge image (without shifting the edge image).

FIG. 17A is a diagram showing the reference pixel of the edge image initially applied by moving unit 1088 to the coordinates (1, 1) in the pixel value information so that the coordinates (1, 1) in the pixel value information coincide with the reference pixel of the edge image. Extractor 1091 extracts a pixel value of every pixel, included in the pixel value information, which coincides with the second-color pixels which are pixels that have a color among all the pixels of the edge image. In the example of FIG. 17A, the pixel at the coordinates (6, 7) included in the pixel value information coincides with a second-color pixel of the edge image. Extractor 1091 extracts "1," which is the pixel value of the pixel at the coordinates (6, 7) coinciding with the second-color pixel. Extractor 1091 extracts no pixel value at coordinates no pixel value for which is stored in the pixel value information (coordinates for which the null information is stored).

Extractor 1091 calculates a summation value of extracted pixel values. In the example of FIG. 17A, the summation value is "1." Extractor 1091 stores the calculated summation value "1" and the coordinates (1, 1) of the reference pixel in association into second pixel value storage unit 1087. The summation value of pixel values calculated by extractor 1091 is a degree of overlap between the edge image and the close-up image.

In the following, "the process of determining as to whether the reference pixel is a second-color pixel" and "the process of extracting a pixel and calculating the summation value upon determination that the reference pixel is a second-color pixel", which are performed by extractor 1091, will be collectively referred to as an "extraction process."

Moving unit 1088 increments the coordinates of the reference pixel by "1" in the X-coordinate direction. In other words, the next reference pixel is the pixel at (2, 1). Adding unit 1084 performs "the extraction process" on this reference pixel. If the X-coordinate value of the reference pixel is at the maximum (13 in the examples of FIGS. 17A to 17C), the X-coordinate value is returned to the initial value ("1" in the present embodiment) and the Y-coordinate value is incremented by "1." In other words, adding unit 1084 shifts the coordinates of the reference pixel in the examples of FIGS. 15A to 15E in order from (1, 1), to (1, 2) . . . (1, 13), (2, 1), (2, 2), (2, 3) . . . (2, 13), (3, 1), (3, 2), (3, 3) . . . (13, 12), and (13, 13), and applies the reference pixel of the edge image to every one of pixels (169 pixels) in the pixel value information, thereby performing the extraction process.

FIG. 17B is a diagram showing the pixel value information having the edge image applied thereto in which the reference pixel is the pixel at (1, 5). In the example of FIG. 17B, the pixel at the coordinates (3, 7) included in the pixel value information coincides with a second-color pixel of the edge image. Extractor 1091 extracts "2," which is the pixel value of the pixel at the coordinates (3, 7) coinciding with the second-color pixel. In the example of FIG. 17B, the pixel at coordinates (4, 8) included in the pixel value information coincides with a second-color pixel of the edge image. Extractor 1091 extracts "4," which is the pixel value of the pixel at coordinates (4, 8) coinciding with the second-color pixel. In the example of FIG. 17B, the pixel at the coordinates (5, 9) included in the pixel value information coincides with a second-color pixel of the edge image. Extractor 1091 extracts "5," which is the pixel value the pixel at the coordinates (5, 9) coinciding with the second-color pixel. In the example of FIG. 17B, the pixel at the coordinates (6, 10) included in the pixel value information coincides with a second-color pixel of the edge image. Extractor 1091 extracts "2," which is the pixel value at the coordinates (6, 10) coinciding with the second-color pixel. In the example of FIG. 17B, the pixel at the coordinates (6, 11) included in the pixel value information coincides with a second-color pixel of the edge image. Extractor 1091 extracts "2," which is the pixel value of the pixel at the coordinates (6, 11) coinciding with the second-color pixel.

In the case of FIG. 17B, extractor 1091 calculates "15" as a summation value of the extracted pixel values. Extractor 1091 stores the calculated summation value "15" (=the degree of overlap between the edge image and the close-up image) and the coordinates (1, 5) of the reference pixel in association into second pixel value storage unit 1087.

FIG. 17C is a diagram showing the pixel value information having the edge image applied thereto in which the reference pixel is the pixel at (1, 2). In the example of FIG. 17C, there is no pixel included in the edge image that coincides with any pixel having a pixel value specified thereto. Accordingly, extractor 1091 stores a summation value "0" (=the degree of overlap between the edge image and the close-up image) and the coordinates (2, 1) of the reference pixel in association into second pixel value storage unit 1087.

As such, extractor 1091 performs the extraction process on every one of pixels (169 pixels) included in the pixel value information using the pixel as a reference pixel, and stores the coordinates of the pixel and a summation value of the pixel values extracted when the pixel is the reference pixel in association into second pixel value storage unit 1087. The information that is stored in second pixel value storage unit 1087 after extractor 1091 completes the extraction process on every pixel (169 pixels) in the pixels value information will be referred to as "pixel value sum information."

Position determination unit 1093 determines a composite position, based on the pixel value sum information. As the composite position, position determination unit 1093 determines a position (a reference location of the edge image in the present embodiment) which yields a smallest summation value of the pixel values of the pixels in the pixel value information that are extracted by extractor 1091. For example, in the example described with reference to FIGS. 17A to 17C, the summation value of pixel values is "zero" when the reference location of the edge image is the coordinates (2, 1). Accordingly, position determination unit 1093 determines the position (2, 1), which yields a smallest summation value of the pixel values which is "zero," as the composite position. Position determination unit 1093 outputs composite position information indicative of the determined composite position to combiner 114.

Next, an idea of the pixel value information will be described. In the examples of FIGS. 15A to 15E, etc., the coordinates of the pixels of the close-up image are (3, 10) and (4, 10), as shown in FIG. 15A, etc. However, the pixel value information according to the present embodiment also includes pixel values that are specified to other pixels around the pixels at (3, 10) and (4, 10). In other words, according to the pixel value information of FIG. 15E, while a "high pixel value (=7)" is specified to the pixels at (3, 10) and (4, 10) of the close-up image, lower pixel values (pixel values such as 1, 2, 4, 5, 6, etc.) are also specified to pixels around these pixels of the close-up image. In contrast, the edge image according to the present embodiment has a narrow edge width, as shown in FIG. 6 and FIG. 16, for example. Moreover, the edge image is overlapped with a low-frequency image corresponding to the far-away image from which the edge image is extracted. The low-frequency image includes edges that have wide edges.

Thus, considering the fact that the low-frequency image contains edges that have wide widths, image processing apparatus 100 according to the present embodiment generates pixel value information which also includes pixel values that are specified to other pixels around the coordinates of the pixels included in the close-up image.

[Flow Chart for Image Processing Apparatus 100]

Figure 18:
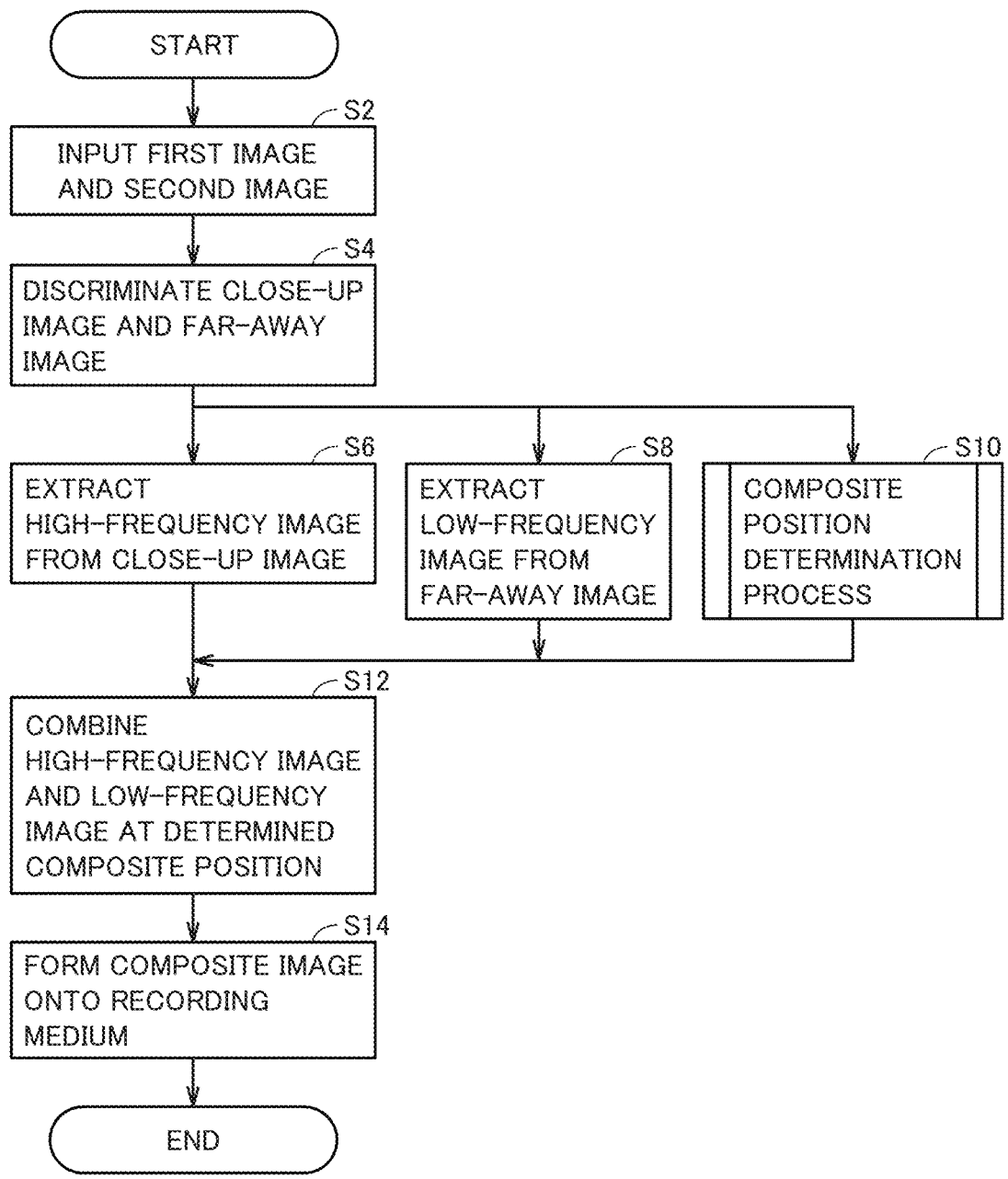
FIG. 18 is a flow chart for the image forming apparatus according to the present embodiment.

FIG. 18 is a diagram showing a flow chart for image processing apparatus 100. Processing by image processing apparatus 100 will be described, with reference to FIG. 18.

Initially, in step S2, the first image (first image data 501) and the second image (second image data 502) are input to input unit 102. Next, in step S4, discriminator 104 discriminates which one of the first image and the second image is a close-up image, and which one of the first image and the second image is a far-away image.

Next, image processing apparatus 100 performs the processes of steps S6, S8, and S10. In step S6, high-frequency image extractor 106 extracts a high-frequency image (an image corresponding to high-frequency image data 521) from the close-up image (an image corresponding to close-up image data 511). In step S8, low-frequency image extractor 112 extracts a low-frequency image (an image corresponding to low-frequency image data 522) from the far-away image (an image corresponding to far-away image data 512). In step S10, determination unit 108 determines a composite position of the high-frequency image and the low-frequency image. Details of step S10 will be described, with reference to FIG. 19.

As the processes of steps S6, step S8, and step S10 end, combiner 114, in step S12, combines the high-frequency image and the low-frequency image at the composite position determined in step S10. Next, in step S14, image forming unit 200 (See FIG. 10) forms a composite image, generated by the combination of the high-frequency image and the low-frequency image, onto a recording medium (forms an image based on composite image data 550 onto a recording medium).

Figure 19:
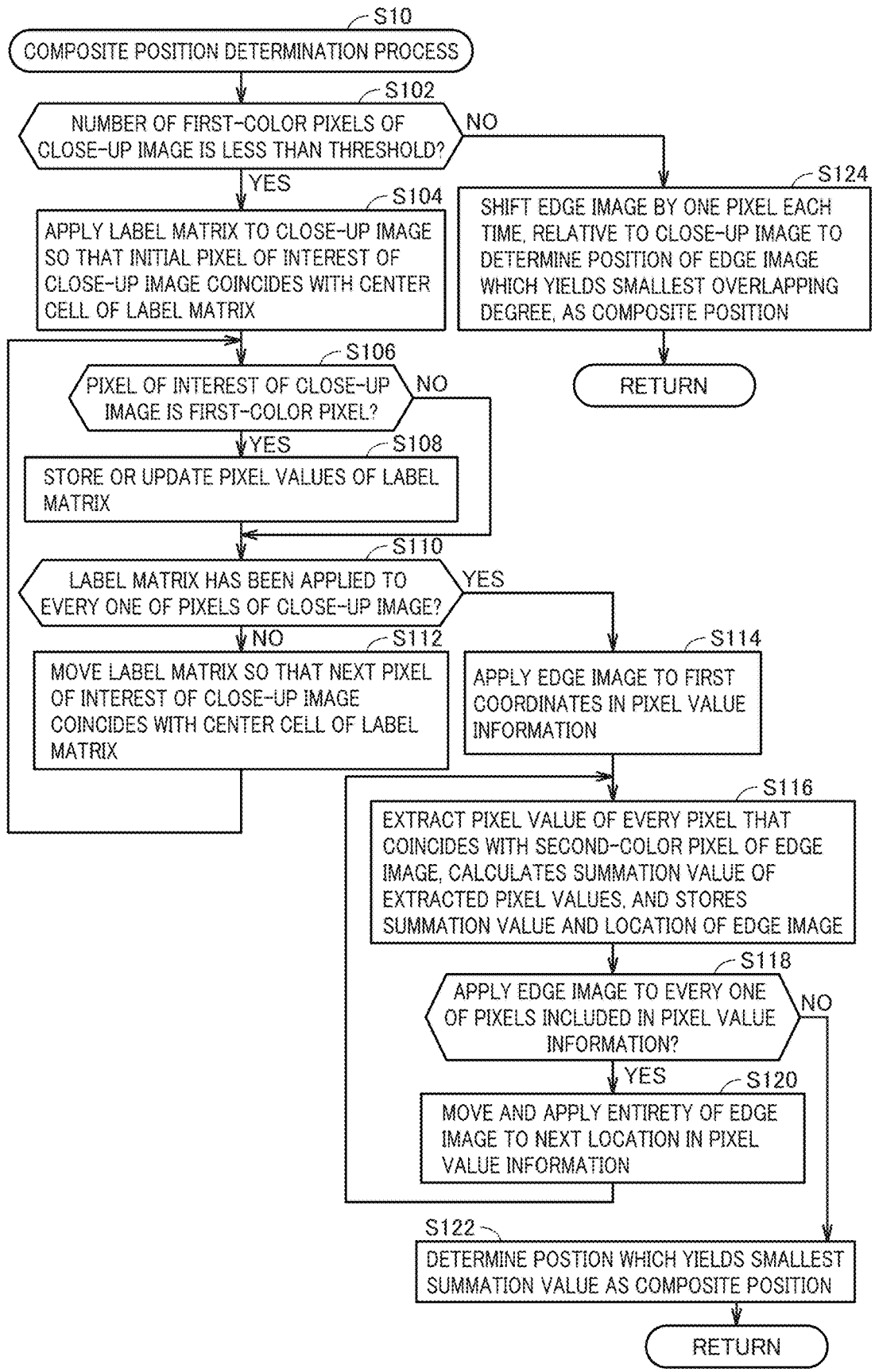
FIG. 19 is a flow chart of a composite position determination process according to the present embodiment.

FIG. 19 is a flow chart of the composite position determination process of S10. Initially, in step S102, judging unit 1082 determines whether a total number of first-color pixels included in the close-up image is less than threshold Th. If judging unit 1082 determines that the total number of first-color pixels is less than threshold Th (NO in S102), the process proceeds to step S104.

In step S104, adding unit 1084 applies label matrix 560 to the close-up image so that the initial pixel of interest (the pixel at (1, 1) in the example of FIG. 15A) of the close-up image coincides with the center cell of label matrix 560 (See FIG. 14). Next, in step S106, adding unit 1084 determines whether the pixel of interest is a first-color pixel. If adding unit 1084 determines that the pixel of interest is a first-color pixel (YES in S106), the process proceeds to step S108. In step S108, adding unit 1084 adds pixel values (see the descriptions with reference to FIG. 15C, etc.) that are specified in label matrix 560 to the pixel of interest and pixels surrounding the pixel of interest, and stores the added values into first pixel value storage unit 1086. The surrounding pixels include first adjacent pixels, second adjacent pixels, third adjacent pixels, and fourth adjacent pixels. As step S108 ends, the process proceeds to step S110. On the other hand, if NO in step S106, the process skips step S108 and proceeds to step S110.

In step S110, adding unit 1084 determines whether label matrix 560 has been applied to every one of pixels of the close-up image. If NO in step S110, adding unit 1084 moves label matrix 560 by one pixel in the X-coordinate direction or the Y-coordinate direction in step S112 so that the next pixel of interest of the close-up image coincides with the center cell of label matrix 560. The process then returns to step S106.

If adding unit 1084 determines that label matrix 560 has been applied to every one of pixels of the close-up image in step S110 (YES in step S110), the process proceeds to step S114. YES in step S110 indicates that the pixel value information is completed.

In step S114, moving unit 1088 applies the edge image to the first coordinates ((1, 1), as shown in FIG. 17A) in the pixel value information.

Next, in step S116, extractor 1091 extracts, from the pixel value information, a pixel value of every pixel that coincides with a second-color pixel of the edge image. In step S116, extractor 1091 further calculates a summation value of all extracted pixel values, and stores the summation value and the location of the edge image in association into second pixel value storage unit 1087. Next, in step S118, extractor 1091 determines whether the edge image has been applied to every one of pixels included in the pixel value information. If NO in step S118, moving unit 1088, in step S120, moves the entirety of the edge image by one pixel in the X-axis direction or the Y-axis direction to the next location in the pixel value information, and applies the edge image to the pixel at the next location. Subsequently, extractor 1091 stores a summation value of extracted pixel values and the location of the edge image in step S116. If YES in step S118, position determination unit 1093, in step S122, determines a position (a reference location of the edge image in the present embodiment) which yields a smallest summation value of the pixel values of all the pixels in the pixel value information extracted by extractor 1091, as the composite position.

In contrast, if the number of first-color pixels included in the close-up image is determined as being greater than or equal to threshold Th in step S102, the process proceeds to step S124. In step S124, determination unit 108 shifts the edge image by one pixel each time, relative to the close-up image to determine a position of the edge image which yields a smallest degree of overlap between the edge image and the close-up image, as the composite position.

Figure 20:
FIG. 20 is a diagram showing one example of another example far-away image.
Figure 21:
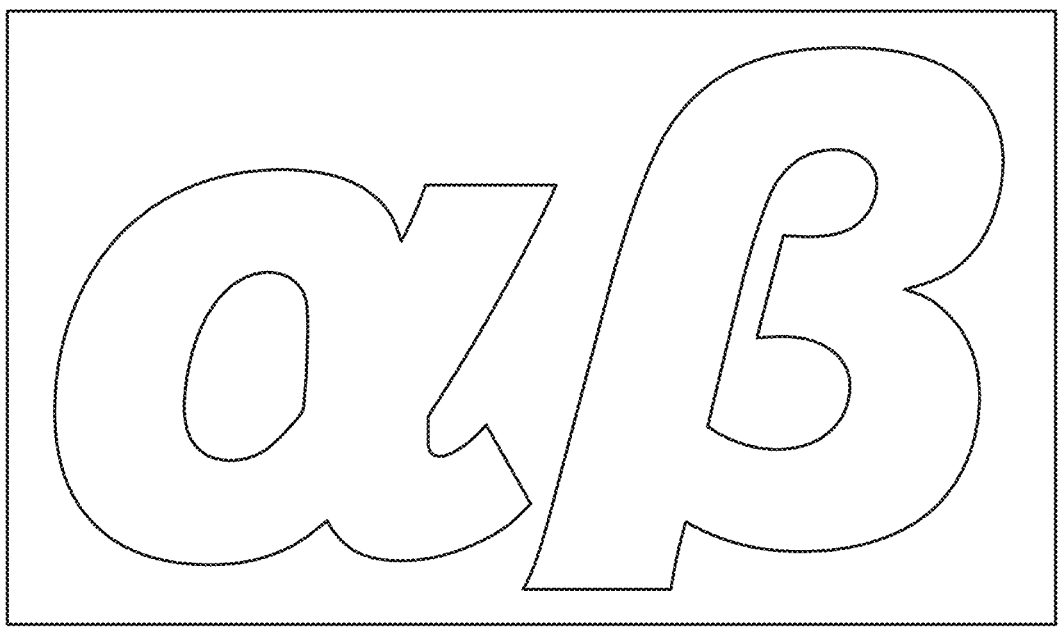
FIG. 21 is a diagram showing one example of another example edge image according to another example.
Figure 22:
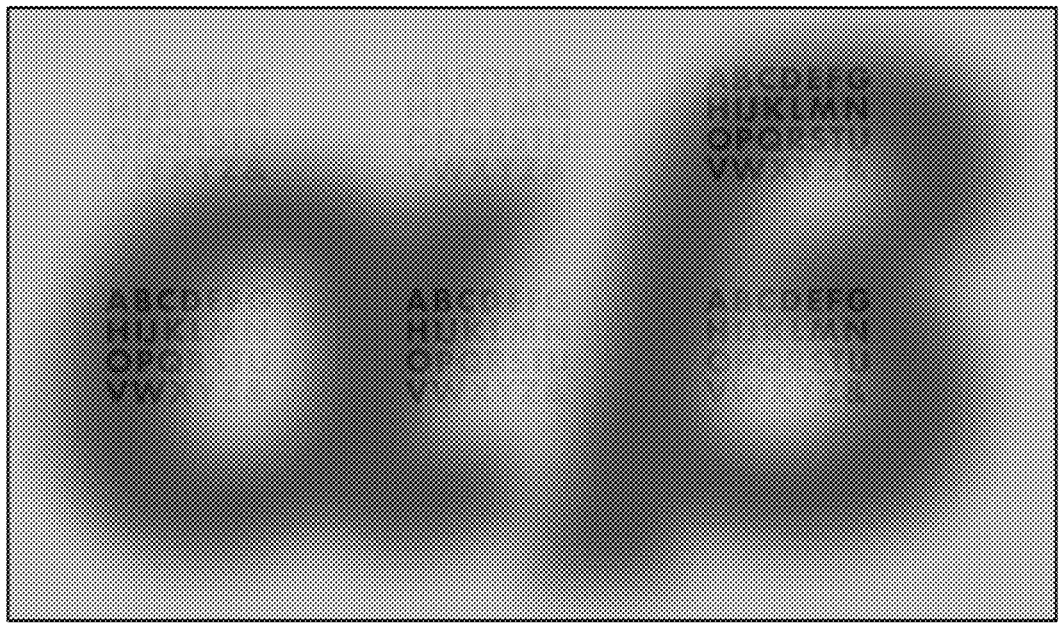
FIG. 22 is a diagram showing one example composite image according to a comparative example.
Figure 23:
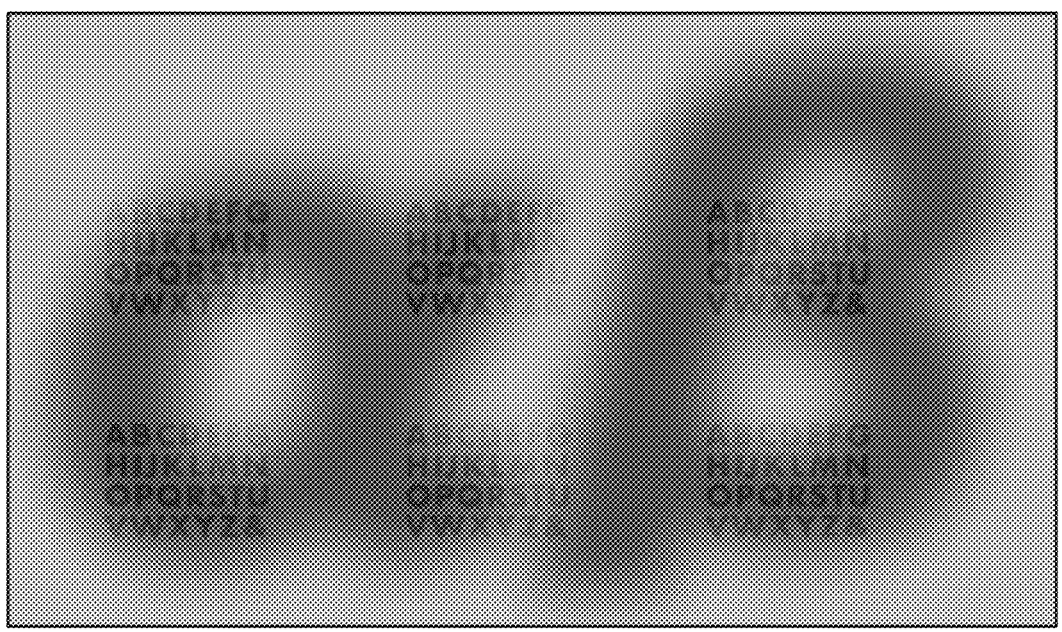
FIG. 23 is a diagram showing one example of another example composite image.

Next, description will be given, with reference to the far-away image being another image. FIG. 20 is a diagram showing another example far-away image. The example of FIG. 20 shows an image of "αβ" as a far-away image. FIG. 21 is one example edge image extracted from the far-away image of FIG. 20 by edge portion extractor 110. FIG. 22 is one example composite image obtained by the image processing apparatus according to the comparative example combining a low-frequency image and a high-frequency image. FIG. 23 is one example composite image obtained by the image processing apparatus according to the present embodiment combining the low-frequency image and the high-frequency image.

[Summary]

(1) According to image processing apparatus 100 of the present embodiment, a first image (close-up image) and a second image (far-away image) are input to input unit 102, as shown in FIG. 12, etc. High-frequency image extractor 106 (first extraction unit) extracts a high-frequency image from the first image (close-up image). Low-frequency image extractor 112 (second extraction unit) extracts a low-frequency image from the second image (far-away image). Edge portion extractor 110 (third extraction unit) extracts edge portions from the far-away image. Determination unit 108 determines a composite position of the high-frequency image and the low-frequency image which so that a degree of overlap between the first image (the close-up image) and the edge image (the image corresponding to edge image data 515) is small (see FIG. 17C, etc.). Combiner 114 combines the high-frequency image and the low-frequency image at the composite position determined by determination unit 108, thereby generating a composite image (See FIG. 7).

Accordingly, image processing apparatus 100 according to the present embodiment can generate a composite image that has a small degree of overlap between the low-frequency image and the high-frequency image, as compared to the composite image generated by a conventional image processing apparatus. Thus, image processing apparatus 100 according to the present embodiment can generate a composite image that is easier for the viewer to perceive.

(2) As two images are input to input unit 102, discriminator 104 discriminates an image that includes a character large in size as the second image, and an image that includes a character small in size as the first image. High-frequency image extractor 106 extracts the high-frequency image from the image (the first image (the close-up image)) discriminated by discriminator 104. Low-frequency image extractor 112 extracts a low-frequency image from the image (the second image (the far-away image)) discriminated by discriminator 104.

Accordingly, with such a configuration, this obviates the need for the user to determine the close-up image and the far-away image between the two images. Accordingly, the user convenience improves.

Note that, as a variation, among two images, discriminator 104 may discriminate the image that includes a character small in size as the second image, and the image that includes a character large in size as the first image. In other words, discriminator 104 may discriminate the first image and the second image, based on the sizes of the characters included in the two images.

(3) As described with reference to FIGS. 16 and 17A to 17C, moving unit 1088 included in determination unit 108 shifts the edge portions of the entirety of the far-away image by a predetermined number of pixels for multiple times, thereby determining a composite position. Accordingly, determination unit 108 can determine a composite position so that a degree of overlap between the edge portions of the entirety of the far-away image and the close-up image is small.

Note that, in the present embodiment, a description is given with reference to the predetermined number of pixels being "one pixel." However, as a variation, the predetermined number of pixels may be other than "one pixel." The predetermined number of pixels may be "two pixels" or "three pixels."

(4) As shown in FIG. 13, judging unit 1082 included in determination unit 108 determines whether a total number of first-color pixels included in the close-up image (a target image) is less than threshold Th (step S102 in FIG. 19). If judging unit 1082 determines that the total number of first-color pixels included in the close-up image (the target image) is less than threshold Th (YES in step S102), adding unit 1084 generates (completes) the pixel value information, using label matrix 560, by the processing below. As described with reference to FIGS. 15A to 15E, adding unit 1084 moves label matrix 560, thereby to determine whether each of all the pixels of the close-up image is a first-color pixel, one pixel after another. In the present embodiment, adding unit 1084 sets one of pixels of the close-up image as the pixel of interest, and applies label matrix 560 to the close-up image so that the pixel of interest coincides with the center cell of label matrix 560. Adding unit 1084 adds the first pixel value ("4" in the example of FIG. 14) to a pixel (the pixel of interest) that is determined as the first-color pixel, and adds the second pixel value ("3" in the example of FIG. 1) to pixels (the first adjacent pixels) adjacent to the pixel determined as the first-color pixel, the second pixel value being smaller than the first pixel value. Adding unit 1084 adds no pixel value to a pixel determined as being not a first-color pixel. Stated differently, adding unit 1084 generates "null information" indicating that no pixel value is added to the pixel. In the complete pixel value information of FIG. 15E, pixels storing no number each correspond to the "null information."

Then, as shown in FIGS. 17A to 17C, moving unit 1088 moves the location of the edge portion relative to the pixel value information by one pixel each time so that the pixels in the pixel value information coincide with the pixels of the edge portion. In the examples of FIGS. 17A to 17C, moving unit 1088 moves the edge portion by one pixel each time, relative to the pixel value information. Each time the extractor 1091 moves the location (relative location) of the edge portion by one pixel, extractor 1091 extracts pixel values of all the pixels in the pixel value information which coincide with second-color pixels among all the pixels of the edge portion. For example, in the example of FIG. 17B, extractor 1091 extracts "2," "4," "5," "2," and "2" as pixel values. Position determination unit 1093 determines the location (relative location) of the edge portion which yields a smallest summation value of the pixel values of the pixels in the pixel value information extracted by extractor 1091, as the composite position. In the examples of FIGS. 17A to 17C, the summation value of the pixel values is the smallest in the case of FIG. 17C. For this reason, the location of the edge portion shown in FIG. 17C is determined as the composite position.

Here, extractor 1091 extracts no pixel value of the pixel whose null information has been generated. For example, a configuration can be contemplated in which when generating the pixel value information, adding unit 1084 adds "0" as a pixel value to the pixel that is not a first-color pixel, rather than generating the null information for that pixel (hereinafter, referred to also as a "configuration of the comparative example"). However, with such a configuration, for example, in the example of FIG. 17B, position determination unit 1093 is required to add "0" as a pixel value of the pixels at (1, 5), (2,6), (7, 11), (8, 12), and (9, 13), in addition to calculating the summation value of the extracted pixel values "2," "4," "5," and "2." This increases the computations by position determination unit 1093.

Thus, in the present embodiment, when generating the pixel value information, adding unit 1084 generates the null information for the pixel that is not a first-color pixel. Accordingly, for example, in the example of FIG. 17B, position determination unit 1093 may only calculate the summation value of the extracted pixel values "2," "4," "5," "2," and "2," and is not required to add "0" as a pixel value of the pixels at (1, 5), (2,6), (7, 11), (8, 12), and (9, 13). Accordingly, in the present embodiment, when generating the pixel value information, if the total number of first-color pixels of the first image (the close-up image) is small, null information is generated for the pixel that is not a first-color pixel, thereby reducing the computations, as compared to the configuration of the comparative example.

Embodiment 2

Figure 24:
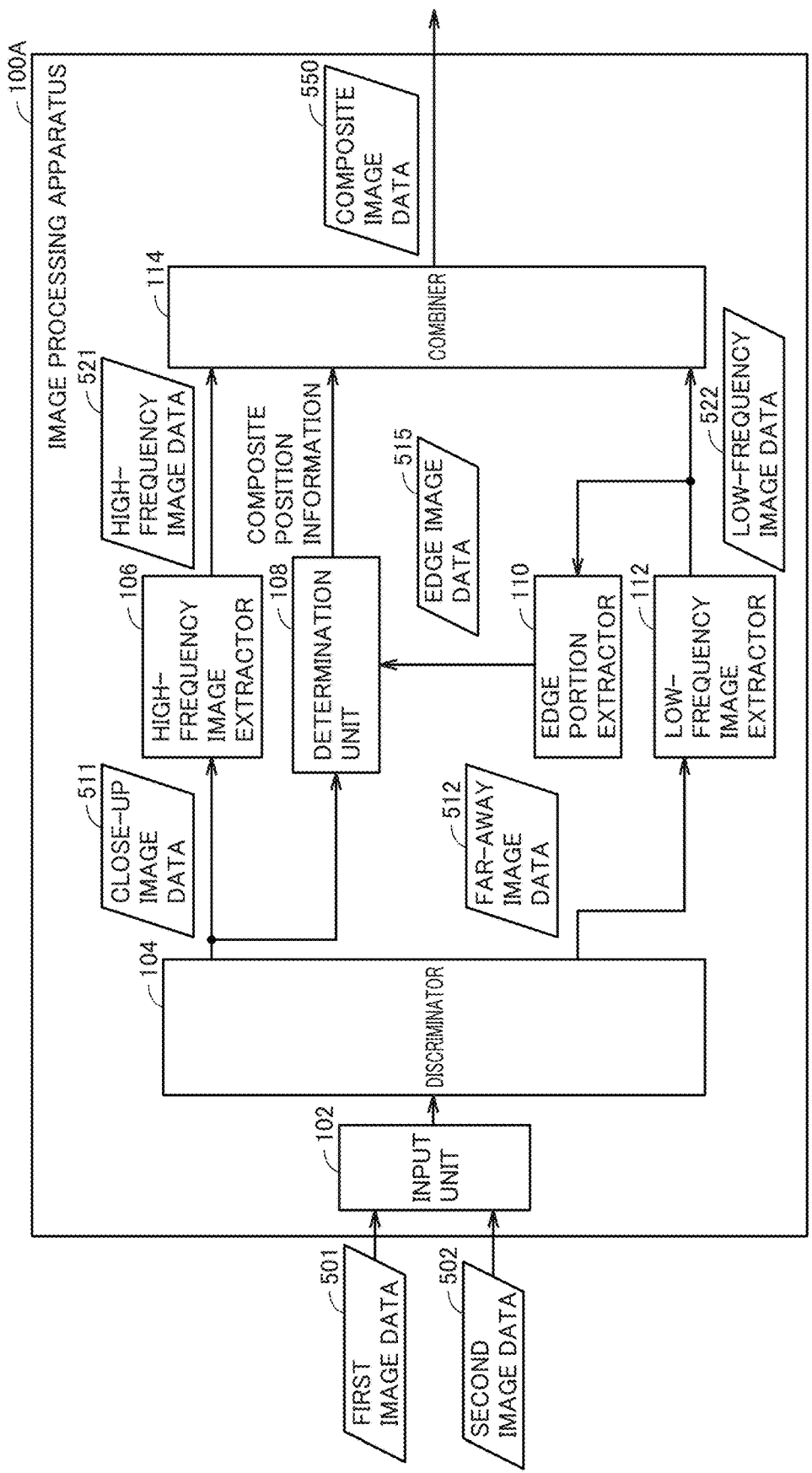
FIG. 24 is a diagram showing an example functional configuration of an image processing apparatus according to still another embodiment.

FIG. 24 is a diagram showing an example functional configuration of an image processing apparatus 100A according to Embodiment 2. In the example of FIG. 12 showing the example functional configuration of image processing apparatus 100 according to Embodiment 1, edge portion extractor 110 extracts the edge image (an image corresponding to edge image data 515) from the far-away image.

In Embodiment 2, edge portion extractor 110 extracts an edge image (an image corresponding to edge image data 515) from a low-frequency image (an image corresponding to low-frequency image data 522). As shown in FIG. 24, far-away image data 512, discriminated by discriminator 104, is not input to edge portion extractor 110. As shown in FIG. 24, low-frequency image data 522 is input to edge portion extractor 110. Edge portion extractor 110 extracts an edge image (the image corresponding to edge image data 515) from the low-frequency image (the image corresponding to low-frequency image data 522). Determination unit 108 according to Embodiment 2 shifts the edge portion of the entirety of the low-frequency image by a predetermined number of pixels for multiple times, thereby determining a composite position.

Image processing apparatus 100A according to Embodiment 2 as such has the same advantages effects as the image processing apparatus according to Embodiment 1.

Embodiment 3

Figure 25:
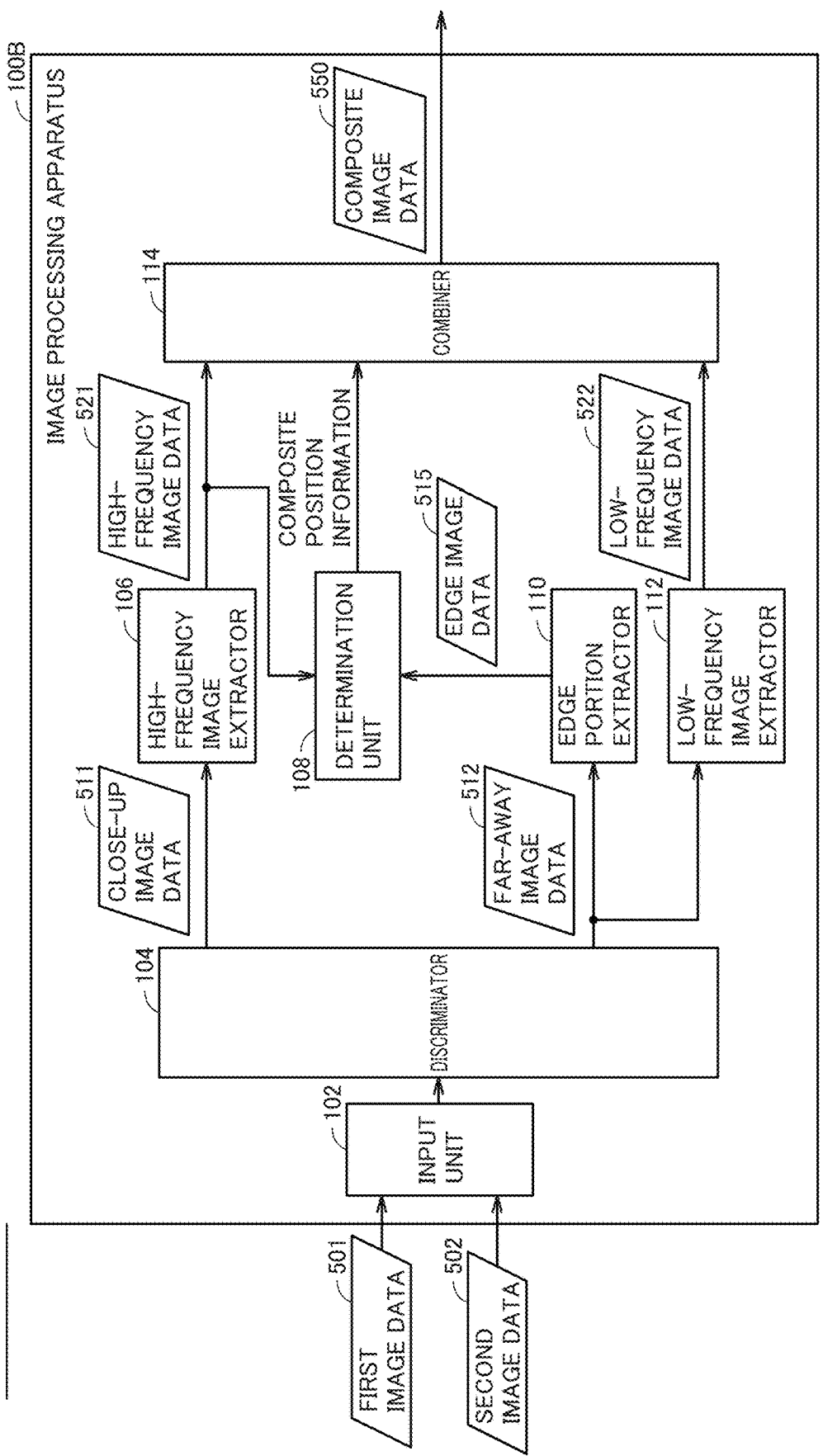
FIG. 25 is a diagram showing an example functional configuration of an image processing apparatus according to still another embodiment.

FIG. 25 is a diagram showing an example functional configuration of an image processing apparatus 100B according to Embodiment 3. In the example of FIG. 12 showing the example functional configuration of image processing apparatus 100 according to Embodiment 1, determination unit 108 uses a close-up image (an image corresponding to close-up image data 511) to determine a composite position.

In Embodiment 3, determination unit 108 uses a high-frequency image (an image corresponding to high-frequency image data 521) to determine a composite position. As shown in FIG. 25, close-up image data 511, discriminated by discriminator 104, is not input to determination unit 108. As shown in FIG. 25, high-frequency image data 521 is input to determination unit 108. Determination unit 108 determines a composite position, based on high-frequency image data 521 and edge image data 515. In Embodiment 3, a judging unit 1082 determines whether a total number of first-color pixels, each having a color, among all pixels of a high-frequency image (a target image), is less than a threshold.

Image processing apparatus 100B according to Embodiment 3 as such has the same advantageous effects as the image processing apparatus according to Embodiment 1.

Embodiment 4

Figure 26:
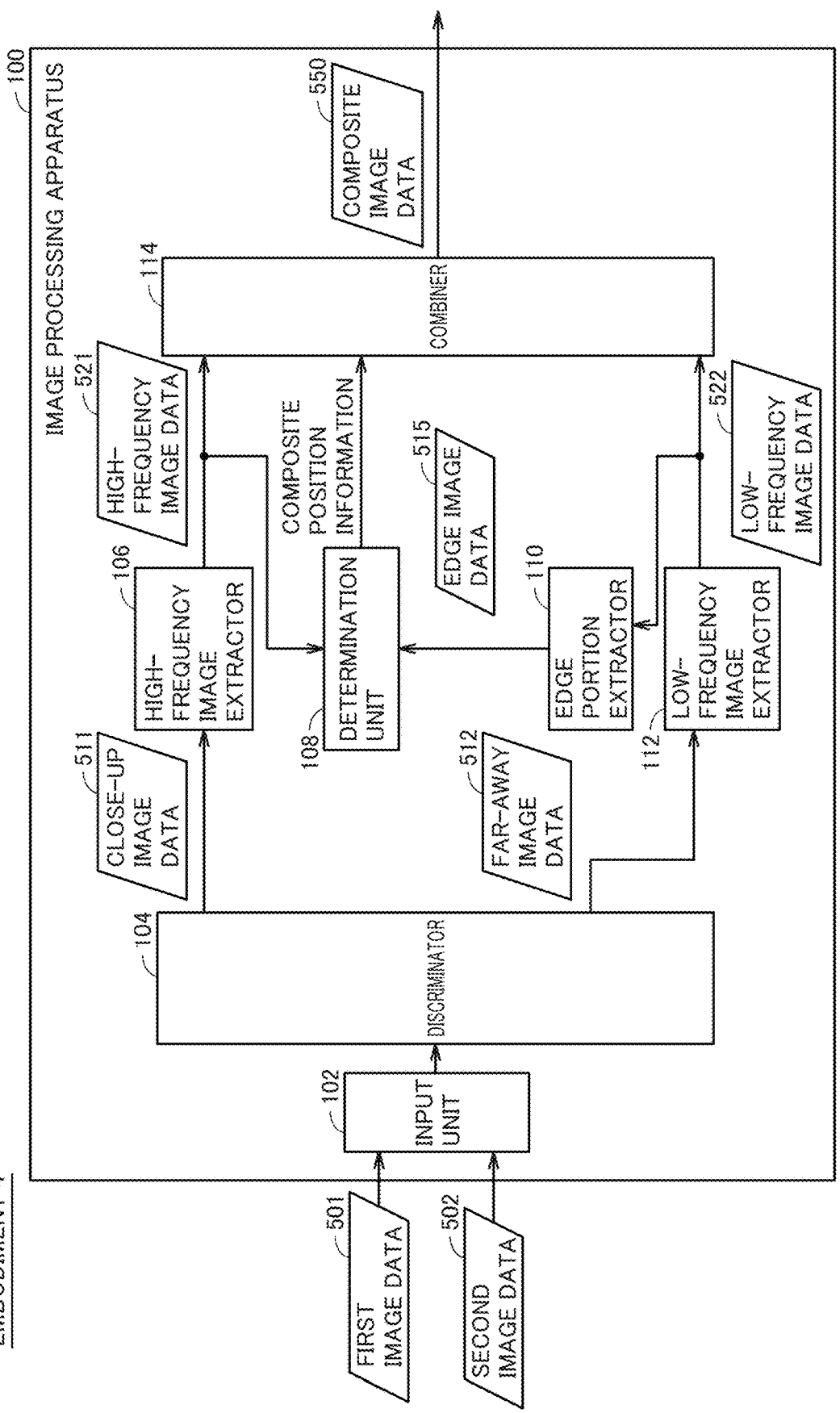
FIG. 26 is a diagram showing an example functional configuration of an image processing apparatus according to still another embodiment.

FIG. 26 is a diagram showing an example functional configuration of an image processing apparatus 100C according to Embodiment 4. As shown in FIG. 26, low-frequency image data 522 is input to an edge portion extractor 110. Edge portion extractor 110 extracts an edge image (an image corresponding to edge image data 515) from a low-frequency image (an image corresponding to low-frequency image data 522). A determination unit 108 according to Embodiment 4 shifts the edge portion of the entirety of the low-frequency image by a predetermined number of pixels for multiple times, thereby determining a composite position.

As shown in FIG. 26, determination unit 108 included in image processing apparatus 100C according to Embodiment 4 uses a high-frequency image (an image corresponding to high-frequency image data 521) to determine the composite position. As shown in FIG. 26, close-up image data 511, discriminated by discriminator 104, is not input to determination unit 108. As shown in FIG. 26, high-frequency image data 521 is input to determination unit 108. Determination unit 108 determines the composite position, based on high-frequency image data 521 and edge image data 515.

Image processing apparatus 100C according to Embodiment 4 as such has the same advantageous effects as the image processing apparatus according to Embodiment 1.

Embodiment 5

Figure 27:
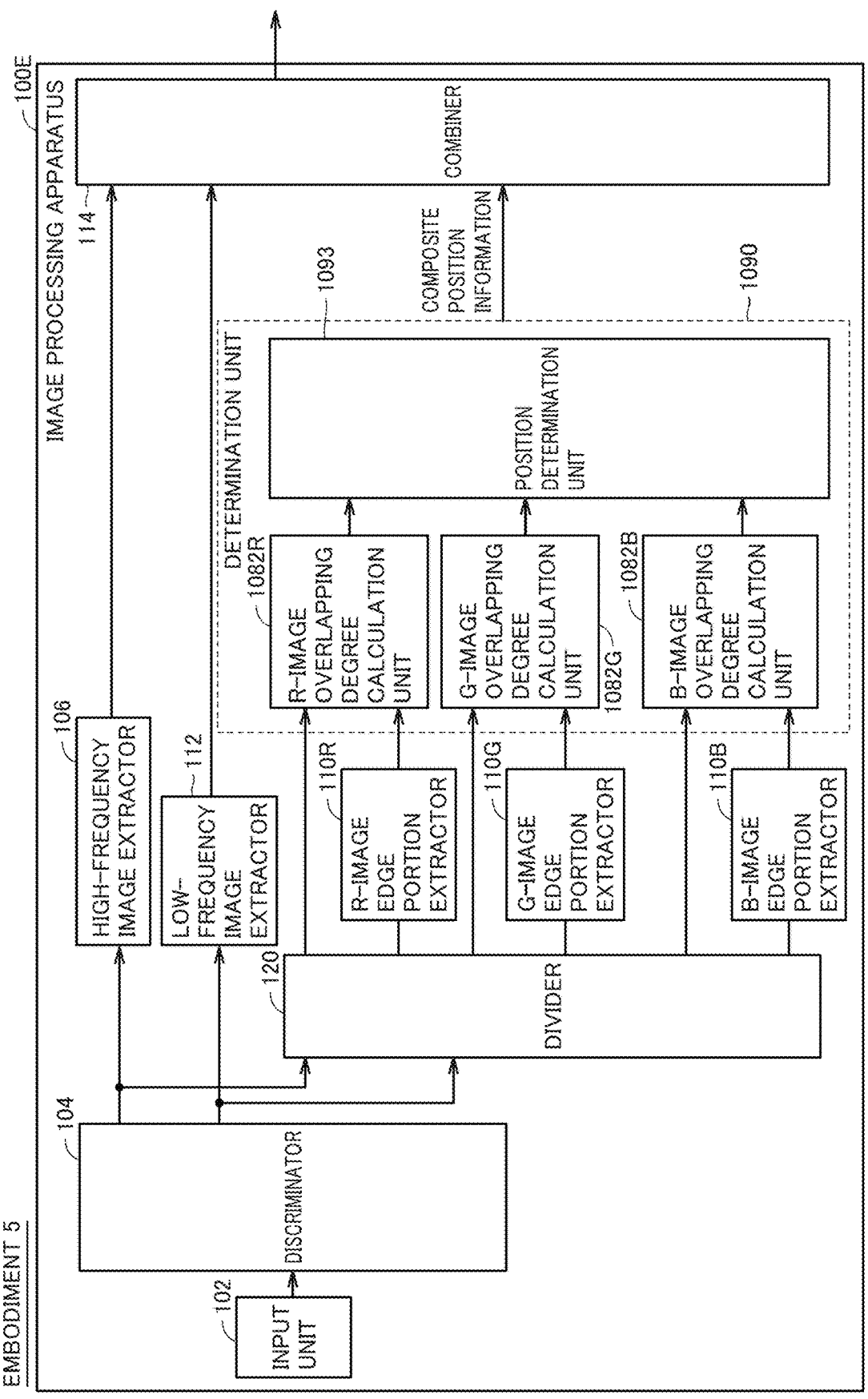
FIG. 27 is a diagram showing an example functional configuration of an image processing apparatus according to still another embodiment.

An image processing apparatus according to Embodiment 5 combines a first image and a second image as appropriate, even if at least one of the first image and the second image is a color image. FIG. 27 is a diagram showing an example functional configuration of an image processing apparatus 100E according to Embodiment 5.

Image processing apparatus 100E has a divider 120, and includes a determination unit 1090 in place of determination unit 108. Determination unit 1090 includes an R-image overlapping degree calculation unit 1082R, a G-image overlapping degree calculation unit 1082G, a B-image overlapping degree calculation unit 1082B, and a position determination unit 1093.

Close-up image data 511 and far-away image data 512 are determined by discriminator 104 and input to divider 120. Divider 120 divides close-up image data 511 and far-away image data 512 into multiple color components. In the present embodiment, suppose that the multiple color components are RGB components. In other words, divider 120 divides close-up image data 511 and far-away image data 512 each into R component, G component, and B component.

Close-up image data having R component is close-up R image data 511R. Far-away image data having R component is far-away R image data 512R. Close-up image data having G component is close-up G image data 511G. Far-away image data having G component is far-away G image data 512G. Close-up image data having B component is close-up R image data 511B. Far-away image data having B component is far-away R image data 512B.

Close-up R image data 511R is input to R-image overlapping degree calculation unit 1082R. Far-away R image data 512R is input to an R-image edge portion extractor 110R. R-image edge portion extractor 110R extracts an edge image having an R image (an image corresponding to edge image data 515R having R image) from far-away R image data 512R. The edge image having the R image (an image corresponding to edge image data 515R having R image) is input to R-image overlapping degree calculation unit 1082R. R-image overlapping degree calculation unit 1082R calculates a degree of overlap for the R image, based on close-up R image data 511R and edge image data 515R having R image.

Here, R-image overlapping degree calculation unit 1082R includes the components (i.e., judging unit 1082, adding unit 1084, moving unit 1088, extractor 1091, threshold storage unit 1085, first pixel value storage unit 1086, second pixel value storage unit 1087) included in determination unit 108 described with reference to FIG. 13, except for position determination unit 1093. R-image overlapping degree calculation unit 1082R calculates a minimum degree of overlap of R component between the close-up image having R image and the edge portions having R image. For example, "close-up image data 511" shown in FIG. 13 is replaced with "close-up R image data 511R," "edge image data 515" shown in FIG. 13 is replaced with "edge image data 515R of R image," and a minimum degree of overlap of R component is calculated.

Similarly, G-image overlapping degree calculation unit 1082G calculates a minimum degree of overlap of G component between the close-up image having G image and edge portions having G image. B-image overlapping degree calculation unit 1082B calculates a minimum degree of overlap of B component between the close-up image having B image and edge portions having B image.

The minimum degree of overlap of R component and a composite position corresponding to the minimum degree, the minimum degree of overlap of G component and a composite position corresponding to the minimum degree, and the minimum degree of overlap of B component and a composite position corresponding to the minimum degree are input to position determination unit 1093. Position determination unit 1093 discriminates the smallest value among the minimum degree of overlap of R component, the minimum degree of overlap of G component, and the minimum degree of overlap of B component. Subsequently, position determination unit 1093 determines a composite position that corresponds to the minimum overlapping degree, which is the smallest value, as the composite position of the high-frequency image and the low-frequency image. Stated differently, determination unit 1090 determines the degree of overlap between the high-frequency image and the edge portion as the degree of overlap which is a smallest degree of overlap in the respective RGB components to determine the composite position.

Image processing apparatus 100E according to the present embodiment calculates an overlapping degree for each of the color components (RGB components), and determines a composite position corresponding to the smallest overlapping degree among the calculated overlapping degrees, as the composite position of the high-frequency image and the low-frequency image. Accordingly, even if at least one of the close-up image and the far-away image is a color image, image processing apparatus 100E according to the present embodiment can generate a composite image (a color composite image) having a small degree of overlap between the low-frequency image and the high-frequency image.

Embodiment 6

In Embodiment 1, discriminator 104 discriminates an image which includes a character small in size as a close-up image, and an image which includes a character large in size as a far-away image. In the present embodiment, among two images having frequency varying components, discriminator 104 discriminates an image having a greater frequency varying component as a close-up image, and an image having a smaller frequency varying component as a far-away image.

As mentioned above, in general, a large character is easily perceived by viewer X from a distance, and a small character is easily perceived by viewer X from near. For example, if an image includes many small characters as shown in FIG. 1, the frequency varies in the image at the same number of portions (edge portions) as the number of small characters. Accordingly, discriminator 104 discriminates an image having a large frequency varying component as a first image (close-up image). If an image includes a small number of large characters as shown in FIG. 2, the frequency varies in the image at the same number of portions (edge portions) as the number of large characters. Accordingly, discriminator 104 discriminates an image having a small frequency varying component as a second image (far-away image).

The image processing apparatus according to the present embodiment discriminates the close-up image and the far-away image, based on the frequency varying components of the two images input to input unit 102. The image processing apparatus according to the present embodiment having such a configuration has the same advantageous effects as the image processing apparatus according to Embodiment 1.

Note that, as a variation, among two images which includes a character, discriminator 104 may discriminate an image that includes a character having a smaller frequency varying component as a first image, and an image that includes a character having a greater frequency varying component as a second image. In other words, discriminator 104 may discriminate the first image and the second image, based on the frequency varying components of the characters included in the two images.

Embodiment 7

Determination unit 108 according to the above-described embodiments has been described as determining the composite position by shifting one of the edge portion of a text string of the entirety of a far-away image and the edge portion of the entirety of a low-frequency image by a predetermined number of pixels for multiple times.

A determination unit 108 according to the present embodiment shifts the edge portion of a character included in a far-away image by a predetermined number of pixels for multiple times, thereby determining a composite position. For example, if the far-away image is an image of three rows of characters "αβ" shown in FIG. 20, determination unit 108 shifts the edge image of the "αβ" in the first row by a predetermined number of pixels for multiple times, thereby determining a composite position of the close-up image and the far-away image, which is "αβ" in the first row. Combiner 114 then combines the close-up image and the far-away image, which is "αβ" in the first row, at the determined composite position.

Determination unit 108 also shifts the edge image of "αβ" in the second row by a predetermined number of pixels for multiple times, thereby determining a composite position of the close-up image and the far-away image which is "αβ" in the second row. Combiner 114 then combines the close-up image and the far-away image, which is "αβ" in the second row, at the determined composite position.

Determination unit 108 also shifts the edge image of "αβ" in the third row by a predetermined number of pixels for multiple times, thereby determining a composite position of the close-up image and the far-away image, which is "αβ" in the third row. Combiner 114 then combines the close-up image and the far-away image, which is "αβ" in the third row, at the determined composite position.

Even if the far-away image includes multiple rows of characters, the image processing apparatus according to the present embodiment can determine the composite position for the characters at each row. Accordingly, even if the far-away image includes multiple rows of characters, the image processing apparatus according to the present embodiment can determine, for each text string, the composite position which yields a small overlapping degree. Thus, as compared to the above-described embodiments, the image processing apparatus according to the present embodiment can generate a composite image which yields an even smaller degree of overlap between the close-up image and the far-away image.

Embodiment 8

A determination unit 108 according to the present embodiment shifts the edge portion of a character included in a far-away image by a predetermined number of pixels for multiple times, thereby determining a composite position. For example, if the far-away image is two characters "αβ" shown in FIG. 20, determination unit 108 shifts the edge image of "α" by a predetermined number of pixels for multiple times, thereby determining a composite position of the close-up image and the far-away image which is "α" Combiner 114 then combines the close-up image and the far-away image, which is "α," at the determined composite position.

Determination unit 108 also shifts the edge image of "β" by a predetermined number of pixels for multiple times, thereby determining a composite position of the close-up image and the far-away image, which is "β". Combiner 114 then combines the close-up image and the far-away image, which is "β," at the determined composite position.

Even if the far-away image includes multiple characters, the image processing apparatus according to the present embodiment can determine the composite position, for each character, which yields a small overlapping degree. Accordingly, as compared to the above-described embodiments, the image processing apparatus according to the present embodiment can generate a composite image which yields an even smaller degree of overlap between the close-up image and the far-away image.

Embodiment 9

In the above-described embodiments, image processing apparatus 100 is described as being included in image forming apparatus 300. However, image processing apparatus 100 may be included in another apparatus. The present embodiment will be described with reference to image processing apparatus 100 included in a display apparatus.

Figure 28:
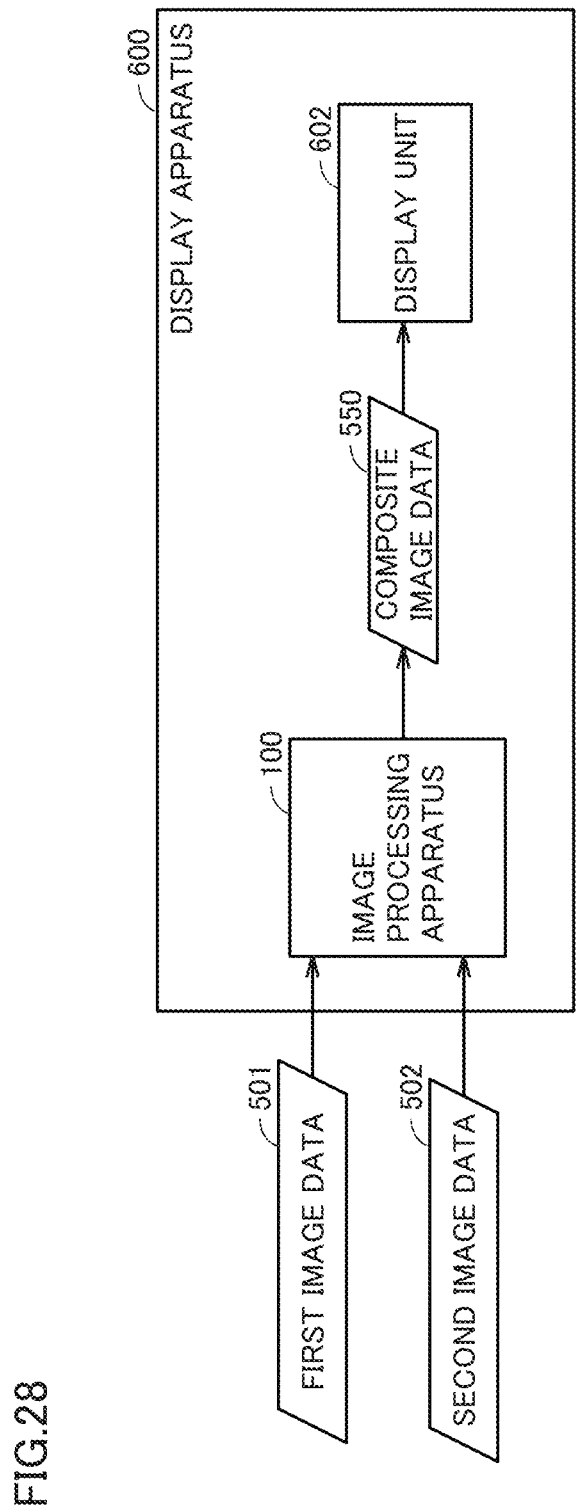
FIG. 28 is a diagram showing an example functional configuration of a display apparatus.

FIG. 28 is a diagram showing an example of including image processing apparatus 100 in a display apparatus 600. The composite image (an image corresponding to composite image data 550) generated by image processing apparatus 100 is input to a display unit 602. Display unit 602 is, for example, a monitor. Display unit 602 displays an image based on composite image data 550. Display unit 602, for example, displays the composite images shown in FIG. 7 and FIG. 23.

Image processing apparatus 100 according to the present embodiment being included in display apparatus 600 allows display of a composite image that is easy for the viewer to perceive. Display apparatus 600 is applied as a signage, for example.

<Variation>

The present embodiment has been described with reference to discriminator 104 discriminating the close-up image and the far-away image. However, the image processing apparatus may not include discriminator 104. With such a configuration, as the user inputs two image data to the image processing apparatus, the image processing apparatus is configured to discriminate the close-up image data and the far-away image data among the two image data. For example, as the user inputs two images, information that allows the image processing apparatus to discriminate a close-up image is input for the close-up image, and information that allows the image processing apparatus to discriminate a far-away image is input for the far-away image. The image processing apparatus employing such a configuration can reduce the processing burden on discriminator 104.

<Configurations>

As described above, the present embodiment include disclosure as follows:

(Configuration 1)

An image processing apparatus, including
a controller that:
receives input of a first image and a second image;
extracts a high-frequency image from the first image;
extracts a low-frequency image from the second image;
extracts a density change portion of one of the second image and the low-frequency image;

determines a composite position of the high-frequency image and the low-frequency image so that a degree of overlap between the density change portion and one of the first image and the high-frequency image is small; and combines the high-frequency image and the low-frequency image at the determined composite position.

(Configuration 2)

The image processing apparatus according to configuration 1, wherein the controller:

if two images are input, discriminates the first image and the second image, based on a size of a character included in each of the two images;

extracts the high-frequency image from the discriminated first image; and extracts the low-frequency image from the discriminated second image.

(Configuration 3)

The image processing apparatus according to configuration 1, wherein the controller:

if two images are input, discriminates the first image and the second image, based on a frequency varying components of each of the two images;

extracts the high-frequency image from the discriminated first image; and extracts the low-frequency image from the discriminated second image.

(Configuration 4)

The image processing apparatus according to configuration 1, wherein the controller shifts one of the density change portion of an entirety of the second image and the density change portion of an entirety of the low-frequency image by a predetermined number of pixels for multiple times to determine the composite position.

(Configuration 5)

The image processing apparatus according to configuration 1, wherein the controller shifts one of the density change portion of a text string included in the second image and the density change portion of a text string included in the low-frequency image by a predetermined number of pixels for multiple times to determine the composite position.

(Configuration 6)

The image processing apparatus according to configuration 1, wherein the controller shifts one of the density change portion of a character included in the second image and the density change portion of a character included in the low-frequency image by a predetermined number of pixels for multiple times to determine the composite position.

(Configuration 7)

The image processing apparatus according to configuration 1, wherein the controller divides the input first image and the input second image each into color components, and the degree of overlap between the high-frequency image and the density change portion is the degree of overlap which is a smallest degree of overlap in the respective color components.

(Configuration 8)

The image processing apparatus according to configuration 1, wherein the controller:

determines whether a total number of first color pixels having a color among pixels of a target image is less than a predetermined threshold, the target image being one of the first image and the high-frequency image;

when the total number of first color pixels is determined to be less than the threshold, determines whether each of the pixels of the target image is a first color pixel one pixel after another, adds a first pixel value to a pixel determined to be a first color pixel, adds a second pixel value to a pixel adjacent to the pixel determined to be the first color pixel, the second pixel value being smaller than the first pixel value, and adds no pixel value to a pixel determined to be not a first color pixel to generate pixel value information;

moves a relative position of the pixel value information and the density change portion by one pixel each time so that pixels included in the pixel value information and pixels of the density change portion coincide with each other;

each time the relative position is moved by one pixel, extracts pixel values of all pixels included in the pixel value information that coincide with second color pixels, having a color, among all pixels of the density change portion; and determines the relative position that yields a smallest summation value of the extracted pixel values as the composite position.

(Configuration 9)

An image forming apparatus, including:

a controller; and an image forming unit, wherein the controller:

receives input of a first image and a second image;

extracts a high-frequency image from the first image;

extracts a low-frequency image from the second image;

extracts a density change portion of one of the second image and the low-frequency image;

determines a composite position of the high-frequency image and the low-frequency image so that a degree of overlap between the density change portion and one of the first image and the high-frequency image is small; and combines the high-frequency image and the low-frequency image at the determined composite position, and the image forming unit forms the combined image onto a recording medium.

(Configuration 10)

A display apparatus, including:

a controller; and a display, wherein the controller:

receives input of a first image and a second image;

extracts a high-frequency image from the first image;

extracts a low-frequency image from the second image;

extracts a density change portion of one of the second image and the low-frequency image;

determines a composite position of the high-frequency image and the low-frequency image so that a degree of overlap between the density change portion and one of the first image and the high-frequency image is small; and combines the high-frequency image and the low-frequency image at the determined composite position, and the display displays the combined image.

(Configuration 11)

An image processing method, including:

extracting a high-frequency image from an input first image;

extracting a low-frequency image from an input second image;

extracting a density change portion of one of the second image and the low-frequency image;

determining a composite position of the high-frequency image and the low-frequency image so that a degree of overlap between the density change portion and one of the first image and the high-frequency image is small; and combining the high-frequency image and the low-frequency image at the composite position.

(Configuration 12)

The image processing method according to configuration 11, further including if two images are input, discriminating the first image and the second image based on a size of a character included in each of the two images, wherein extracting the high-frequency image from the input first image is extracting the high-frequency image from the discriminated first image, and extracting the low-frequency image from the input second image is extracting the low-frequency image from the discriminated second image.

(Configuration 13)

A computer-readable storage medium storing a program for causing a computer to:

extract a high-frequency image from an input first image;

extract a low-frequency image from an input second image;

extract a density change portion of one of the second image and the low-frequency image;

determine a composite position of the high-frequency image and the low-frequency image so that a degree of overlap between the density change portion and one of the first image and the high-frequency image is small; and combine the high-frequency image and the low-frequency image at the composite position.

(Configuration 14)

The storage medium according to configuration 13, further causing the computer to:

if two images are input, discriminate the first image and the second image based on a size of a character included in each of the two images, wherein extracting the high-frequency image from the input first image is extracting the high-frequency image from the discriminated first image, and extracting the low-frequency image from the input second image is extracting the low-frequency image from the discriminated second image.

(Configuration 15)

The storage medium according to configuration 13, further causing the computer to:

if two images are input, discriminate the first image and the second image, based on a frequency varying component of each of the two images, wherein extracting the high-frequency image from the input first image is extracting the high-frequency image from the discriminated first image, and extracting the low-frequency image from the input second image is extracting the low-frequency image from the discriminated second image.

(Configuration 16)

The storage medium according to configuration 13, wherein determining the composite position of the high-frequency image and the low-frequency image includes: determining the composite position by shifting one of the density change portion of an entirety of the second image and the density change portion of an entirety of the low-frequency image by a predetermined number of pixels for multiple times.

(Configuration 17)

The storage medium according to configuration 13, wherein determining the composite position of the high-frequency image and the low-frequency image includes determining the composite position by shifting one of the density change portion of a text string included in the second image and the density change portion of a text string included in the low-frequency image by a predetermined number of pixels for multiple times.

(Configuration 18)

The storage medium according to configuration 13, wherein determining the composite position of the high-frequency image and the low-frequency image includes determining the composite position by shifting one of the density change portion of a character included in the second image and the density change portion of a character included in the low-frequency image by a predetermined number of pixels for multiple times.

(Configuration 19)

The storage medium according to configuration 13, further causing the computer to divide the input first image and the input second image into color components, wherein determining the composite position of the high-frequency image and the low-frequency image includes determining the degree of overlap between the high-frequency image and the density change portion as the composite position which is a smallest degree of overlap in the respective color components.

(Configuration 20)

The storage medium according to configuration 13, wherein determining the composite position of the high-frequency image and the low-frequency image includes:

determining whether a total number of first color pixels having a color among pixels of a target image is less than a predetermined threshold, the target image being one of the first image and the high-frequency image;

when the total number of first color pixels is determined to be less than the threshold, determining whether each of the pixels of the target image is a first color pixel one pixel after another, adding a first pixel value to a pixel determined to be a first color pixel, adding a second pixel value to a pixel adjacent to the pixel determined to be the first color pixel, the second pixel value being smaller than the first pixel value, and adding no pixel value to a pixel determined to be not a first color pixel to generate pixel value information;

moving a relative position of the pixel value information and the density change portion by one pixel each time so that pixels included in the pixel value information and pixels of the density change portion coincides with each other;

each time the relative position is moved by one pixel, extracting pixel values of all pixels included in the pixel value information that coincide with second color pixels, having a color, among all pixels of the density change portion, and determining the relative position that yields a smallest summation value of the extracted pixel values as the composite position.

Although embodiments of the present disclosure have been described and illustrated in detail, the disclosed embodiments are made for purposes of illustration and example only and not limitation. The scope of the present disclosure should be interpreted by terms of the appended claims

What is claimed is:

1. An image processing apparatus, comprising a controller that:
receives input of a first image that is configured to be viewed up close;
receives input of a second image that is configured to be viewed from a distance;
extracts a high-frequency image from the first image that is configured to be viewed up close;
extracts a low-frequency image from the second image that is configured to be viewed from a distance;
extracts a density change portion of one of the second image and the low-frequency image;
determines a composite position of the high-frequency image and the low-frequency image so that a degree of overlap between the density change portion and one of the first image and the high-frequency image is small; and
combines the high-frequency image and the low-frequency image at the determined composite position.

2. The image processing apparatus according to claim 1, wherein the controller: if two images are input,
discriminates the first image and the second image, based on a size of a character included in each of the two images;
extracts the high-frequency image from the discriminated first image; and extracts the low-frequency image from the discriminated second image.

3. The image processing apparatus according to claim 1, wherein the controller: if two images are input,
discriminates the first image and the second image, based on a frequency varying components of each of the two images;
extracts the high-frequency image from the discriminated first image; and extracts the low-frequency image from the discriminated second image.

4. The image processing apparatus according to claim 1, wherein the controller shifts one of the density change portion of an entirety of the second image and the density change portion of an entirety of the low-frequency image by a predetermined number of pixels for multiple times to determine the composite position.

5. The image processing apparatus according to claim 1, wherein the controller shifts one of the density change portion of a text string included in the second image and the density change portion of a text string included in the low-frequency image by a predetermined number of pixels for multiple times to determine the composite position.

6. The image processing apparatus according to claim 1, wherein the controller shifts one of the density change portion of a character included in the second image and the density change portion of a character included in the low-frequency image by a predetermined number of pixels for multiple times to determine the composite position.

7. The image processing apparatus according to claim 1, wherein the controller divides the input first image and the input second image each into color components, and the degree of overlap between the high-frequency image and the density change portion is the degree of overlap which is a smallest degree of overlap in the respective color components.

8. The image processing apparatus according to claim 1, wherein the controller:
determines whether a total number of first color pixels having a color among pixels of a target image is less than a predetermined threshold, the target image being one of the first image and the high-frequency image;
when the total number of first color pixels is determined to be less than the threshold, determines whether each of the pixels of the target image is a first color pixel one pixel after another, adds a first pixel value to a pixel determined to be a first color pixel, adds a second pixel value to a pixel adjacent to the pixel determined to be the first color pixel, the second pixel value being smaller than the first pixel value, and adds no pixel value to a pixel determined to be not a first color pixel to generate pixel value information;
moves a relative position of the pixel value information and the density change portion by one pixel each time so that pixels included in the pixel value information and pixels of the density change portion coincide with each other;
each time the relative position is moved by one pixel, extracts pixel values of all pixels included in the pixel value information that coincide with second color pixels, having a color, among all pixels of the density change portion; and determines the relative position that yields a smallest summation value of the extracted pixel values as the composite position.

9. An image forming apparatus, comprising:
a controller; and
an image former,
wherein the controller:
receives input of a first image that is configured to be viewed up close;
receives input of a second image that is configured to be viewed from a distance;
extracts a high-frequency image from the first image that is configured to be viewed up close;
extracts a low-frequency image from the second image that is configured to be viewed from a distance;
extracts a density change portion of one of the second image and the low-frequency image;
determines a composite position of the high-frequency image and the low-frequency image so that a degree of overlap between the density change portion and one of the first image and the high-frequency image is small; and
combines the high-frequency image and the low-frequency image at the determined composite position, and the image former forms the combined image onto a recording medium.

10. A display apparatus, comprising:
a controller; and
a display,
wherein the controller:
receives input of a first image that is configured to be viewed up close;

receives input of a second image that is configured to be viewed from a distance;

extracts a high-frequency image from the first image that is configured to be viewed up close;

extracts a low-frequency image from the second image that is configured to be viewed from a distance;

extracts a density change portion of one of the second image and the low-frequency image;

determines a composite position of the high-frequency image and the low-frequency image so that a degree of overlap between the density change portion and one of the first image and the high-frequency image is small; and combines the high-frequency image and the low-frequency image at the determined composite position, and the display displays the combined image.

11. An image processing method, comprising:

extracting a high-frequency image from an input first image that is configured to be viewed up close;

extracting a low-frequency image from an input second image that is configured to be viewed from a distance;

extracting a density change portion of one of the second image and the low-frequency image;

determining a composite position of the high-frequency image and the low-frequency image so that a degree of overlap between the density change portion and one of the first image and the high-frequency image is small; and combining the high-frequency image and the low-frequency image at the composite position.

12. The image processing method according to claim 11, further comprising if two images are input, discriminating the first image and the second image based on a size of a character included in each of the two images, wherein extracting the high-frequency image from the input first image is extracting the high-frequency image from the discriminated first image, and extracting the low-frequency image from the input second image is extracting the low-frequency image from the discriminated second image.

13. A non-transitory computer-readable storage medium storing a program for causing a computer to:

extract a high-frequency image from an input first image that is configured to be viewed up close;

extract a low-frequency image from an input second image that is configured to be viewed from a distance;

extract a density change portion of one of the second image and the low-frequency image;

determine a composite position of the high-frequency image and the low-frequency image so that a degree of overlap between the density change portion and one of the first image and the high-frequency image is small; and combine the high-frequency image and the low-frequency image at the composite position.

14. The non-transitory computer-readable storage medium according to claim 13, further causing the computer to: if two images are input, discriminate the first image and the second image based on a size of a character included in each of the two images, wherein extracting the high-frequency image from the input first image is extracting the high-frequency image from the discriminated first image, and extracting the low-frequency image from the input second image is extracting the low-frequency image from the discriminated second image.

15. The non-transitory computer-readable storage medium according to claim 13, further causing the computer to if two images are input, discriminate the first image and the second image, based on a frequency varying component of each of the two images, wherein extracting the high-frequency image from the input first image is extracting the high-frequency image from the discriminated first image, and extracting the low-frequency image from the input second image is extracting the low-frequency image from the discriminated second image.

16. The non-transitory computer-readable storage medium according to claim 13, wherein determining the composite position of the high-frequency image and the low-frequency image includes: determining the composite position by shifting one of an entirety of the density change portion of the second image and an entirety of the density change portion of the low-frequency image by a predetermined number of pixels for multiple times.

17. The non-transitory computer-readable storage medium according to claim 13, wherein determining the composite position of the high-frequency image and the low-frequency image includes determining the composite position by shifting one of the density change portion of a text string included in the second image and the density change portion of a text string included in the low-frequency image by a predetermined number of pixels for multiple times.

18. The non-transitory computer-readable storage medium according to claim 13, wherein determining the composite position of the high-frequency image and the low-frequency image includes determining the composite position by shifting one of the density change portion of a character included in the second image and the density change portion of a character included in the low-frequency image by a predetermined number of pixels for multiple times.

19. The non-transitory computer-readable storage medium according to claim 13, further causing the computer to divide the input first image and the input second image into color components, wherein determining the composite position of the high-frequency image and the low-frequency image includes determining the degree of overlap between the high-frequency image and the density change portion as the degree of overlap which is a smallest degree of overlap in the respective color components.

20. The non-transitory computer-readable storage medium according to claim 13, wherein determining the composite position of the high-frequency image and the low-frequency image includes:

determining whether a total number of first color pixels having a color among pixels of a target image is less than a predetermined threshold, the target image being one of the first image and the high-frequency image;

when the total number of first color pixels is determined to be less than the threshold, determining whether each of the pixels of the target image is a first color pixel one pixel after another, adding a first pixel value to a pixel determined to be a first color pixel, adding a second pixel value to a pixel adjacent to the pixel determined to be the first color pixel, the second pixel value being smaller than the first pixel value, and adding no pixel value to a pixel determined to be not a first color pixel to generate pixel value information;

moving a relative position of the pixel value information and the density change portion by one pixel each time so that pixels included in the pixel value information and pixels of the density change portion coincides with each other;

each time the relative position is moved by one pixel,
- extracting pixel values of all pixels included in the pixel value information that coincide with second color pixels, having a color, among all pixels of the density change portion, and
- determining the relative position that yields a smallest summation value of the extracted pixel values as the composite position.

\* \* \* \* \*